United States Patent
Nishimoto et al.

[19]

[11] Patent Number: 6,092,172
[45] Date of Patent: Jul. 18, 2000

[54] DATA PROCESSOR AND DATA PROCESSING SYSTEM HAVING TWO TRANSLATION LOOKASIDE BUFFERS

[75] Inventors: Junichi Nishimoto, Hachioji; Osamu Nishii, Inagi; Fumio Arakawa, Kodaira; Susumu Narita, Kokubunji; Masayuki Ito, Higashimurayama; Makoto Toda, Hachioji; Kunio Uchiyama, Kodaira, all of Japan

[73] Assignee: Hitachi, Ltd., Tokyo, Japan

[21] Appl. No.: 08/950,668

[22] Filed: Oct. 15, 1997

[30] Foreign Application Priority Data

Oct. 16, 1996 [JP] Japan ...................................... 8-273431

[51] Int. Cl.⁷ ............................ G06F 12/00; G06F 13/00
[52] U.S. Cl. ........................ 711/207; 711/203; 711/205; 711/206
[58] Field of Search ..................................... 711/133, 166, 711/154, 200, 205, 206, 207

[56] References Cited

U.S. PATENT DOCUMENTS

| | | | |
|---|---|---|---|
| 5,465,337 | 11/1995 | Kong | 711/207 |
| 5,497,480 | 3/1996 | Hayes et al. | 711/166 |
| 5,627,992 | 5/1997 | Baror | 711/133 |
| 5,712,998 | 1/1998 | Rosen | 711/205 |
| 5,737,590 | 4/1998 | Hara | 712/238 |
| 5,752,275 | 5/1998 | Hammond | 711/207 |
| 5,784,708 | 7/1998 | Bridges et al. | 711/207 |

OTHER PUBLICATIONS

Power PC 603 RISC Microprocessor User's Manual, Motorola, 1994, pp. 7.1–7.19.

*Primary Examiner*—Tuan V. Thai
*Attorney, Agent, or Firm*—Antonelli, Terry, Stout & Kraus, LLP

[57] ABSTRACT

A data processor in which a speed of an address translating operation is raised is disclosed. A translation lookaside buffer is divided into a buffer for data and a buffer for instruction, address translation information for instruction is also stored into a translation lookaside buffer for data, and when a translation miss occurs in a translation lookaside buffer for instruction, new address translation information is fetched from the translation lookaside buffer for data. A high speed of the address translating operation can be realized as compared with that in case of obtaining address translation information from an external address translation table each time a translation miss occurs in the translation lookaside buffer for instruction.

18 Claims, 11 Drawing Sheets

- 1K BYTE PAGE

VIRTUAL ADDRESS

PHYSICAL ADDRESS

- 4K BYTE PAGE

VIRTUAL ADDRESS

PHYSICAL ADDRESS

- 64K BYTE PAGE

VIRTUAL ADDRESS

PHYSICAL ADDRESS

- 1M BYTE PAGE

VIRTUAL ADDRESS

PHYSICAL ADDRESS

VIRTUAL ADDRESS SPACE

DATA PROCESSOR AND DATA PROCESSING SYSTEM HAVING TWO TRANSLATION LOOKASIDE BUFFERS

BACKGROUND OF THE INVENTION

The invention relates to a data processor having a translation lookaside buffer and, more particularly, a data processing system using such a data processor. For example, the invention relates to a technique which is effective when it is applied to the realization of a high data processing speed.

In a virtual storage system, a virtual memory space which is sufficiently larger than a physical memory is prepared and a process is mapped into the virtual memory space. Now, "process" means a program which is being executed under management of an OS (Operating System). It is, therefore, sufficient to consider only the operation on a virtual memory as for the process. A MMU (Memory Management Unit) is used for mapping from the virtual memory to the physical memory. The MMU is usually managed by the OS (Operating System) and exchanges the physical memory so that the virtual memory which is needed by the process can be mapped into the physical memory. The exchange of the physical memory is performed between the MMU and a secondary storage or the like. The MMU generally also has a function to protect the storage so that a certain process doesn't erroneously access a physical memory of another process.

When an address translation from an address (virtual address) in the virtual memory to an address (physical address) in the physical memory is performed by using the MMU, there is a case where the address translation information is not registered in the MMU or a virtual memory of another process is erroneously accessed. In this instance, the MMU generates an exception, changes the mapping of the physical memory, and registers new address translation information.

Although the function of the MMU can be realized even by only software, if the translation is performed by software each time the process accesses to the physical memory, the efficiency thereof low. To prevent it, a translation lookaside buffer for address translation is prepared on the hardware and address translation information which is frequently used is stored in the translation lookaside buffer. That is, the translation lookaside buffer is constructed as a cache memory for the address translation information. A different point from an ordinary cache memory is that when the address translation fails, the exchange of the address translation information is performed mainly in dependence on software.

Various cache memories are widely used to realize a high speed of data and instruction access.

SUMMARY OF THE INVENTION

The present inventors have examined the translation lookaside buffer and cache memory from a viewpoint of realizing a high speed of the memory access. As a processor to divide the translation lookaside buffer into a buffer for an instruction and a buffer for data, for example, there is a processor disclosed in PowerPC 603 RISC Microprocessor User's Manual (MOTOROLA, 1994). The processor further individually has a data cache memory and an instruction cache memory. At pages 7 to 15 of this literature, it will be understood that an instruction TLB miss and a data TLB miss are separately treated in the PowerPC. According to the examination of the present inventors, even if the translation lookaside buffers are separately provided, since there is no interrelation between them, if the address translation fails, necessary address translation information has to be obtained from an external memory and it has been found that there is a limitation in realization of a high memory accessing speed.

As for the cache memory, when a cache miss occurs, a cache entry is newly read out from the external memory by only an amount of one entry. In this instance, if there is no invalid cache entry, a valid cache entry is swept out from the cache memory in accordance with a logic such as LRU (Least Recently Used) or the like. The cache entry which was swept out as mentioned above may include data or instruction to be subsequently used. Therefore, it is desirable that an instruction to specify a processing routine such that a high speed or the like is required is always held in the cache memory. In such a case, it is also considered to enable the cache memory to be used as a random access memory. However, if all of the areas in the cache memory are constructed as mentioned above, all of the functions as a cache memory are lost, so that a case where an inconvenience is caused in dependence on an application is also presumed.

It is an object of the invention to provide a data processor which can realize a high memory accessing speed. In more detail, it is an object to provide a technique for realizing a high memory accessing speed from a viewpoint of address translation and to provide a technique for realizing a high memory accessing speed from a viewpoint of a cache memory.

The above and other objects and novel features of the present invention will be clarified from the description of the specification and the annexed drawings.

An outline of a typical invention among the inventions disclosed in the present invention will be briefly described as follows.

That is, according to a first aspect of the invention, a translation lookaside buffer is separately used for data and for an instruction, address translation information for instruction is also stored into the translation lookaside buffer for data, and when a translation miss occurs in the translation lookaside buffer for instruction, new address translation information is fetched from the translation lookaside buffer for data.

In detail, a data processor (1) comprises: a central processing unit (2); a first translation lookaside buffer (4) in which a part of address translation information to translate a virtual address that is treated by the central processing unit into a physical address is stored and which association-retrieves, from the address translation information, a physical address corresponding to the virtual address that is outputted by the central processing unit; and a second translation lookaside buffer (3) in which address translation information regarding an instruction address in address translation information possessed by the first translation lookaside buffer is stored and which association-retrieves, from the address translation information, a physical address corresponding to the virtual address that is outputted by the central processing unit upon instruction fetching, when a result of the associative retrieval indicates a retrieval miss, association-retrieves the first translation lookaside buffer by a virtual address according to the retrieval miss, and obtains the address translation information retrieved by the associative retrieval.

Another data processor according to such an aspect comprises: a central processing unit; a first translation lookaside buffer in which a part of address translation information to translate a virtual address that is treated by the central processing unit into a physical address is stored and which associatively retrieves, from the address translation information, a physical page number corresponding to a virtual page number that is outputted by the central processing unit; a second translation lookaside buffer in which address translation information regarding an instruction address in address translation information possessed by the first translation lookaside buffer is stored and which associatively retrieves, from the address translation information, a physical page number corresponding to the virtual page number that is outputted by the central processing unit upon instruction fetching; and a buffer control circuit (320) for, when a result of the associative retrieval by the second translation lookaside buffer indicates a retrieval miss, associatively retrieving the first translation lookaside buffer by a virtual page number according to the retrieval miss, and for supplying the address translation information retrieved by the associative retrieval to the second translation lookaside buffer.

According to the above means, when the translation miss occurs in the translation lookaside buffer for instruction, since the new address translation information is fetched from the translation lookaside buffer for data. Therefore, a high speed of the address translating operation can be realized as compared with a case of obtaining the address translation information from an external address translation table every time at the time of the translation miss. Thus, a high memory accessing speed is accomplished. Particularly, a reason why the translating speed of the instruction address is made high is because an operand fetch is performed in accordance with a decoding result of the fetched instruction or because a capacity of the translation lookaside buffer for instruction is reduced (the number of entries is small) as compared with that of the translation lookaside buffer for data.

When the result of the associative retrieval by the second translation lookaside buffer indicates the retrieval miss and the result of the associative retrieval of the first translation lookaside buffer by the virtual page number according to the retrieval miss indicates the retrieval miss, the central processing unit reads out the address translation information including the virtual page number according to the retrieval miss from an external memory provided out of the data processor by an exceptional process and writes the read-out address translation information into the first translation lookaside buffer. After completion of the exceptional process, the interrupted address translating operation is continued.

According to another aspect of the invention, only a partial area in the cache memory is selectively made operative as a random access memory. In other words, the cache function is suppressed for only the partial area.

In detail, the data processor further comprises a data cache memory (6) in which a cache entry of data is stored in correspondence to the physical page number and to which the physical page number which was associatively retrieved by the first translation lookaside buffer is supplied and which associatively retrieves the cache entry corresponding to the physical page number. In this instance, a part of the data cache memory is mapped into a predetermined area (E1) that is specified by the virtual address. The data processor further comprises first RAM area discrimination control means (605) for detecting the access to the predetermined area and allowing the data cache memory to perform a random accessing operation.

The data processor further includes an instruction cache memory (5) in which a cache entry of an instruction is stored in correspondence to the physical page number and to which the physical page number which is associatively retrieved by the second translation lookaside buffer is supplied and which associatively retrieves a cache entry corresponding to the physical page number. In this instance, a part of the instruction cache memory is mapped into the predetermined area (E1) that is specified by the virtual address. The data processor further comprises second RAM area discrimination control means (505) for detecting the access to the predetermined area and for allowing the instruction cache memory to perform a random accessing operation.

According to the above means, the predetermined areas in the data cache memory and the instruction cache memory are accessed at random and the remaining areas in both of the cache memories are made operative as cache memories to be associatively retrieved. Therefore, particularly, a condition that desired instruction and data which need a high accessing speed are always held in the cache memory and a condition that the instruction and data used recently are held in the cache memory can be satisfied. It contributes to the improvement of a data processing speed.

According to still another aspect of the invention, as an index address to select a cache line of the cache memory, a bit position of the virtual address is switched to an upper bit position than that in the ordinary operation. Thus, the cache memory is divided every large address space and is allocated to a virtual memory space.

In more detail, index mode designating means (630) for selectively using a bit on the upper side of the virtual address for the selection of the cache line of the data cache memory is further provided.

Index mode designating means (530) for selectively using a bit on the upper side of the virtual address for the selection of the cache line of the instruction cache memory is further provided.

According to the above means, since the bit on the upper side of the virtual address can be used for an index of the cache. Therefore, the cache memory is divided every large address space and can be allocated to the virtual memory space. Thus, the cache of a direct mapping can be falsely treated as a set-associative cache. The invention can contributes to the improvement of the data processing speed.

Further another aspect of the invention is to improve a use efficiency of the data processor.

First, an I/O register area (I/O register space) is mapped from a virtual address space (address space on the virtual memory) to a physical address space (address space on the physical memory). That is, there is further provided detecting means (606) for inputting the physical page number which is outputted by an associated hit by the associative retrieval due to the first translation lookaside buffer, for detecting whether the inputted physical page number coincides with the page number allocated to the I/O register space in the data processor or not, for suppressing the associative retrieving operation of the data cache memory by the detection of the coincidence, and for allowing the I/O register to be directly accessed. In this instance, the translation information which is stored into the first translation lookaside buffer has protection information to specify an access privilege to a page and there is provided access protecting means (405) for discriminating an access privilege for the relevant page on the basis of the protection information of translation information according to the associated hit. Thus, the storage protection can be also performed for the I/O register space.

Second, the translation information which is stored into the first translation lookaside buffer has cache write mode specified information (WT) for specifying which one of write-through and write-back is used as a write control mode for the data cache memory, and there is provided cache write control means (614) for controlling a cache write mode for the relevant page on the basis of the cache write mode information included in the translation information regarding the associated hit. In the write-through mode, the writing operation is performed to both of the cache memory and the external memory in case of a cache hit and is performed to only the external memory in case of a cache miss. In the write-back mode, data is written into a cache entry (cache line) regarding the hit in case of the cache hit, one cache entry is read out from the external memory in case of the cache miss (cache fill), a tag address is updated, and data is written to the cache line. A dirty bit of the cache line which was cache filled as mentioned above is set into a set state. When the cache line which is swept out from the cache memory by the cache fill is dirty, the cache line is written back to the external memory. In this manner, in case of the write-through mode, although the contents in the cache memory and the external memory are always made coincident, the number of times of access to the external memory increases. In the write-back mode, although the number of times of access to the external memory is small, in the case where a period of time during which the contents in the cache memory and the external memory don't coincide exists and a plurality of cache memories unifies the external memory, there is a case where a consistency between the cache memory and the external memory cannot be held. If the write-through mode and the write-back mode can be selected on a page unit basis, the relation between the consistency of the cache memory and the external memory and the accessing speed can be optimized in accordance with the system construction or the contents of the process.

A data processing apparatus to which the above data processor is applied has an external memory connected to the data processor and its secondary storage.

DESCRIPTION OF THE PREFERRED EMBODIMENT

[Construction of data processor]

Figure 1:
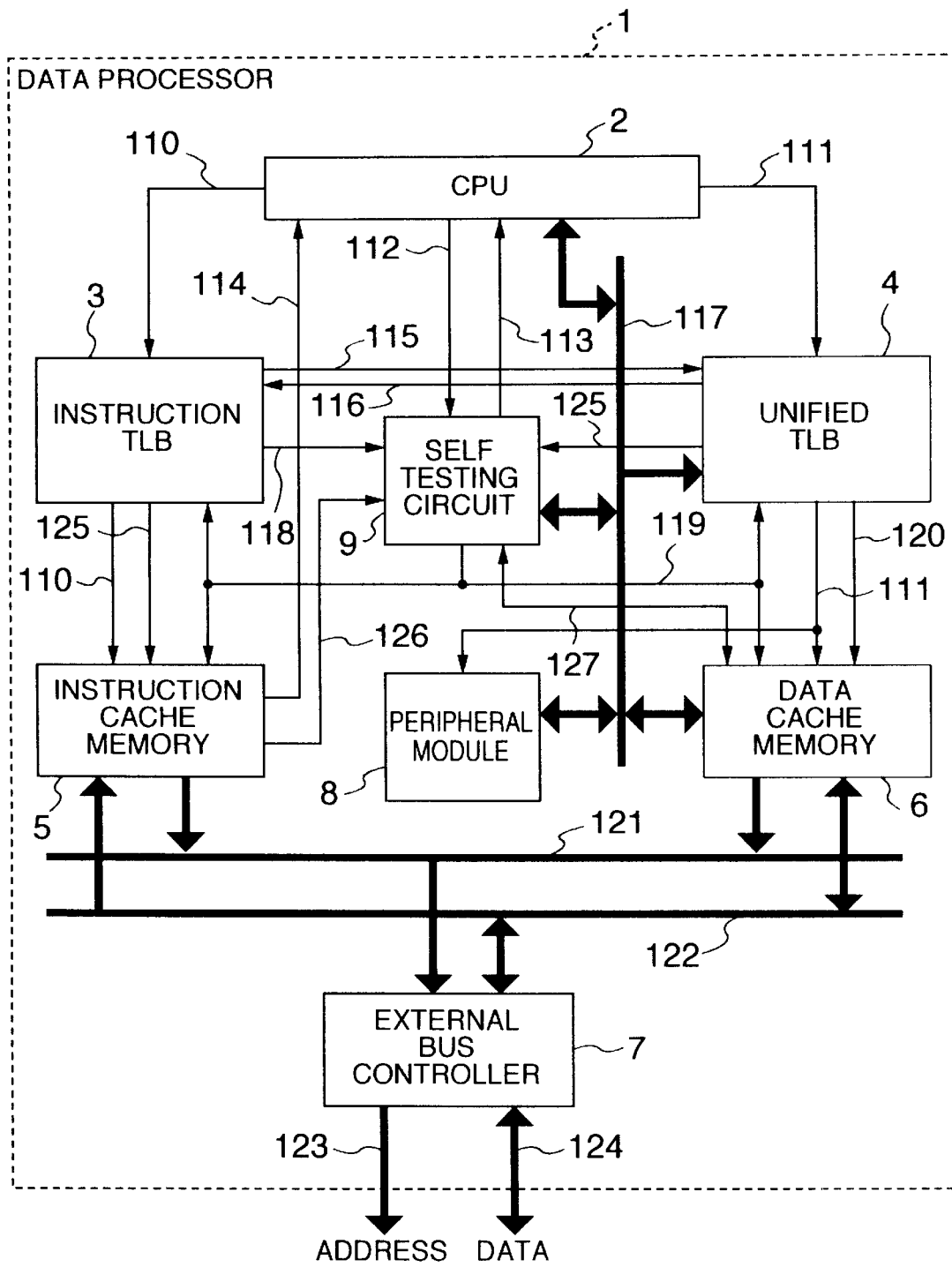
FIG. 1 is a block diagram of a data processor according to an example of the invention.

FIG. 1 shows a block diagram of a data processor according to an example of the invention. Although not particularly limited, a data processor 1 shown in the diagram has a pipeline RISC (Reduced Instruction Set Computer) architecture of 32 bits and an instruction set of the data processor has a fixed length of 16 bits.

The data processor 1 individually has TLBs (translation lookaside buffers) 3 and 4 for instruction and for data so as to enable an instruction access and a data access by a central processing unit (CPU) 2 to be performed in parallel. An instruction cache memory 5 and a data cache memory (operand cache memory) 6 are also made individual.

Although not particularly limited, the data processor 1 handles a virtual address space that is specified by a virtual address of 32 bits and a physical address space that is specified by a physical address of 29 bits. Address translation information to translate the virtual address into the physical address includes a virtual page number and a physical page number corresponding thereto. An address translation table is formed in an external memory of the data processor 1. In the address translation information in the address translation table, a part of the information used recently is stored into the translation lookaside buffers 3 and 4. Its control is performed by, for example, the OS of the data processor 1.

The TLB for data (also referred to as a unified TLB) 4 stores the address translation information of data and instruction by an amount of up to 64 entries. From the address translation information, the unified TLB 4 associatively retrieves a physical page number corresponding to a virtual page number of a virtual address that is outputted to a signal line 111 by the CPU 1 for fetching data and translates the virtual address to the physical address. The virtual address space is divided into units of pages and is translated into physical addresses on a page unit basis.

The TLB for instruction (hereinafter, also referred to as an instruction TLB) 3 stores address translation information only for instruction by an amount of up to four entries. Particularly, entries possessed by the instruction TLB 3 are used as a part of the translation information of instruction addresses possessed by the unified TLB 4. The supply of the entries from the unified TLB 4 to the instruction TLB 3 is performed through a signal line 116. From the address translation information, the instruction TLB 3 associatively retrieves a physical page number corresponding to a virtual page number of a virtual address that is outputted to a signal line 110 by the CPU 1 for fetching the instruction and translates the virtual address to the physical address. In case of a retrieval miss, an operation to obtain the target address translation information from the unified TLB 4 is instructed through a signal line 115.

The data cache memory 6 receives the physical address translated by the unified TLB 4 upon data fetching through a signal line 120 and performs an association retrieval of the cache entry on the basis of it. When the retrieval result indicates a read hit, data corresponding to the physical address is outputted to a CPU bus 117 from the cache line according to the hit. When the retrieval result indicates a read miss, data of one cache line including data regarding the miss is read out from the external memory through a bus controller 7 and a cache fill is performed, so that the data regarding the miss is read out to the CPU bus 117. When the retrieval result indicates a write miss, its operation is made different in accordance with a write-through mode or a write-back mode, which will be explained in detail hereinlater.

The instruction cache memory 5 receives the physical address translated by the instruction TLB 3 upon instruction fetching through a signal line 125 and executes an associative retrieval of the cache entry on the basis of the physical address. When the retrieval result indicates a read hit, an instruction corresponding to the physical address is outputted to a signal line 114 from a cache line corresponding to the hit. When the retrieval result indicates a read miss, data of one cache line including the instruction corresponding to the miss is read out from the external memory (not shown) through the bus controller 7 and the cache fill is executed. Thus, the instruction regarding the miss is supplied to the CPU 2 through the signal line 114.

Although the details will be explained later, it is stated here that partial data areas in the instruction cache memory 5 and data cache memory 6 can be selectively accessed at random.

In addition to the unified TLB 4 and data cache memory 6, a peripheral module 8 and a self testing circuit 9 are connected to the CPU bus 117. Proper circuits such as timer, serial interface controller, and the like are included in the peripheral module 8.

When a self testing instruction is supplied from the CPU 2 through a signal line 112, the self testing circuit 9 writes and reads data into/from storing areas in the instruction TLB 3, unified TLB 4, instruction cache memory 5, and data cache memory 6 and returns a message of the completion of the test to the CPU 2 through a signal line 113. A test result can be read by the CPU 2 via the CPU bus 117. The self testing circuit 9 supplies an access address signal and write data for tests to the instruction TLB 3 and the like through a signal line 119. Although not particularly limited, the data read out from the instruction TLB 3, unified TLB 4, instruction cache memory 5, and data cache memory 6 is supplied to the self testing circuit 9 through dedicated signal lines 118, 125, 126, and 127, respectively.

The instruction cache memory 5, data cache memory 6, and external bus controller 7 are connected by a cache address bus 121, a cache data bus 122, and a control bus (not shown). The external bus controller 7 controls an activation of an external bus cycle which is necessary to fetch data that is necessary for the cache fill of the instruction cache memory 5 and the data cache memory 6 from the external memory and to write back the data of the cache line of the data cache memory 6 into the external memory. The external bus controller 7 is connected to an external address bus 123, an external data bus, and an external control bus (not shown). The external memory (not shown) is connected to the external address bus 123, an external data bus 124, and the like. The data processor 1 shown in FIG. 1 is formed on one semiconductor substrate such as monocrystalline silicon.

[Unified TLB]

Figure 2:
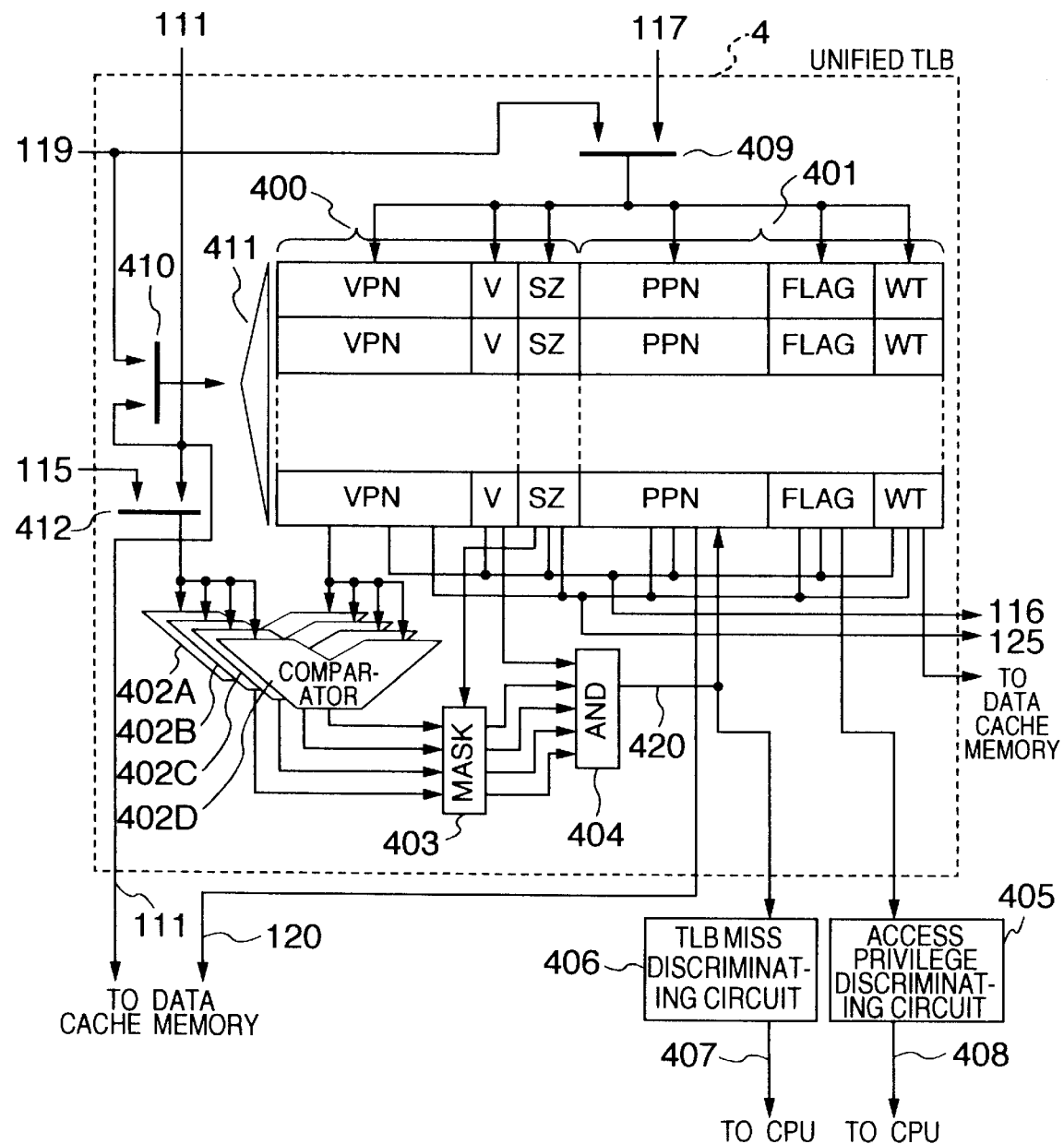
FIG. 2 is a block diagram showing an example of a unified TLB.

FIG. 2 shows a block diagram of an example of the unified TLB 4. The unified TLB 4 has a memory cell array to store up to 64 TLB entries. The memory cell array is constructed by an address array 400 and a data array 401. Although not particularly limited, one TLB entry has a virtual page number VPN, a valid bit V, a size bit SZ, a physical page number PPN, a flag FLAG, and a cache write mode bit WT. Areas to store the virtual page number VPN, valid bit V, and size bit SZ are constructed in an address array 400. Areas to store the physical page number PPN, flag FLAG, and cache write mode bit WT are constructed in a data array 401.

Figure 3:
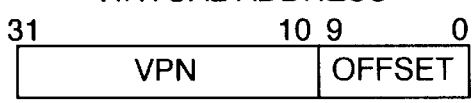
FIG. 3 is an explanatory diagram of a page size.
Figure 3:
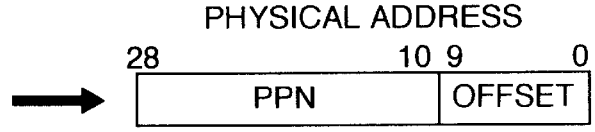
Figure 3:
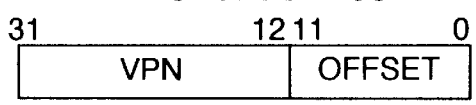
Figure 3:
Figure 3:
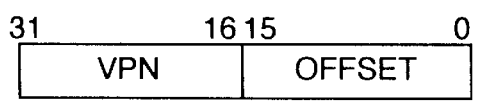
Figure 3:
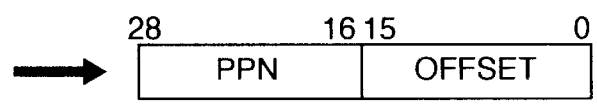
Figure 3:
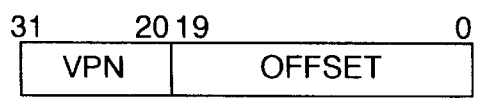
Figure 3:
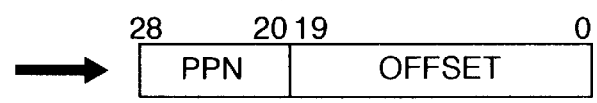

Although not particularly limited, as shown in FIG. 3, a page size of the virtual address can be selected from sizes of 1 kbytes, 4 kbytes, 64 kbytes, and 1 M bytes. The page size is designated by the size bits SZ of two bits.

The valid bit V indicates a validity of the TLB entry including it and denotes a valid status by the logic value "1". The flag FLAG includes protection data or the like. The protection data is data of two bits in which an access privilege of the page is shown by a code. For instance, "00" denotes that only the reading is possible in a privilege mode. "01" denotes that the reading and the writing are possible in the privilege mode. "10" denotes that only the reading is possible in the privilege mode and a user mode. "11" denotes that the reading and the writing are possible in the privilege mode and the user mode. The cache write mode bit WT designates in which one of the write-through mode and the write-back mode the data cache memory 6 is made operative. As will be explained hereinlater, the write-through mode or the write-back mode can be selected on a page unit basis for the data cache memory 6.

Although not particularly limited, the address array 400 is made up of a CAM (Content Addressable Memory) and a memory cell itself has a comparing function as is well known. In the retrieving operation, memory cells of the address array 400 are selected in parallel and execute the comparing operation. In FIG. 2, a circuit element which executes the comparing operation is conceptually shown as a comparator. Four comparators 402A to 402D typically shown indicate elements of comparing circuits corresponding to areas in which the virtual page number of one TLB entry has been stored. Reference numeral 402A is intended to be an element for performing the comparator operation of bit 10 to bit 11 of the virtual address; 402B an element for performing the comparator operation of bit 12 to bit 15 of the virtual address; 402C an element for performing the comparator operation of bit 16 to bit 19 of the virtual address; and 402D an element for performing the comparator operation of bit 20 to bit 31 of the virtual address. When a comparison result in each of the comparing circuits 402A to 402D indicates that all bits coincide, a comparison result signal is set to the logic value "1".

Comparison targets by the comparators 402A to 402D are set to corresponding bits of the virtual page numbers which are supplied through the signal line 111. Reference numeral 403 denotes a masking circuit for masking the comparison results by the comparing circuits 402A to 402C in accordance with the size bit SZ. That is, when the size bit SZ indicates a page of 1 kbytes, the comparison results of the comparing circuits 402A to 402C are not masked. When the size bit SZ indicates a page of 4 kbytes, the comparison result of the comparing circuit 402A is masked. When the size bit SZ indicates a page of 64 kbytes, the comparison results of the comparing circuits 402A and 402B are masked. When the size bit SZ indicates a page of 1 Mbytes, the comparison results of the comparing circuits 402A to 402C are masked. According to this example, the masked comparison result is forcedly set to the logic value "1" and is outputted from the masking circuit 403. An output of the masking circuit 403 and the valid bit V of the corresponding TLB entry are supplied to an AND circuit 404. An output of the AND circuit 404 is used as a hit/miss signal 420 of the TLB entry. Actually, the comparing circuits 402A to 402D, masking circuit 403, and AND circuit 404 are provided for each of the 64 storing areas of the TLB entry. Therefore, when the TLB entry including the virtual page number which is transferred to the signal line 111 exists, the output of the AND circuit 404 corresponding to the TLB entry is set to the logic value "1".

The output of each AND circuit 404 is used as a selection signal of the corresponding TLB entry line in the data section 401. The physical page number PPN of the TLB entry line corresponding to the selection signal of the logic value "1" is outputted to the signal line 120. The flag FLAG is outputted to an access privilege discriminating circuit 405. The cache write mode bit WT is outputted to the data cache memory 6.

The physical page number PPN sent to the signal line 120 is supplied to the data cache memory 6 together with an offset (offset of the physical address) of the virtual address transferred to the signal line 111 and the like.

A signal (not shown) indicating that the data processor 1 is at present in which one of the user mode and the privilege mode and indicating which one of the reading and the writing the accessing operation by the CPU 2 instructs is supplied to the access privilege discriminating circuit 405. On the basis of this signal, a check is made to see if the content of the flag FLAG is adapted to the present operating mode of the data processor. When it is not adapted, a protection violation exceptional signal 408 is supplied to the CPU 2.

The output of each AND circuit 404 is supplied to a TLB miss discriminating circuit 406. When it is determined that the outputs of all of the AND circuits 404 are set to the logic value "0", the TLB miss discriminating circuit 406 supplies a TLB miss exceptional signal 407 to the CPU 2. When the TLB miss exception is accepted, the CPU 2 executes an exceptional process for adding, for example, the TLB entry regarding the TLB miss to the unified TLB 4 from the address translation table of the external memory by the OS. In the addition of the TLB entry, the TLB entry to be added is fetched to the address section 400 and data section 401 from the CPU bus 117 through a selector 409. The selection of the TLB entry line in this instance is performed by fetching an index address which is sent to the signal line 111 from the CPU 2 by a selector 410 and by decoding it by an index decoder 411. Although not particularly limited, the selection control for the selectors 409 and 410 is executed by the TLB miss discriminating circuit 406.

Although the details will be explained hereinlater, when an instruction of a retrieval reading process is made to the unified TLB 4 from the instruction TLB 3, a virtual page number for a retrieval hit discrimination in the retrieval reading is supplied from the signal line 115 through a selector 412. The output of the TLB entry in the retrieval reading process is executed to the signal line 116. An index address for the TLB entry selection in the self test is supplied from the signal line 119 to the selector 410. Write data in the self test is supplied from the signal line 119 through the selector 409.

[Instruction TLB]

Figure 4:
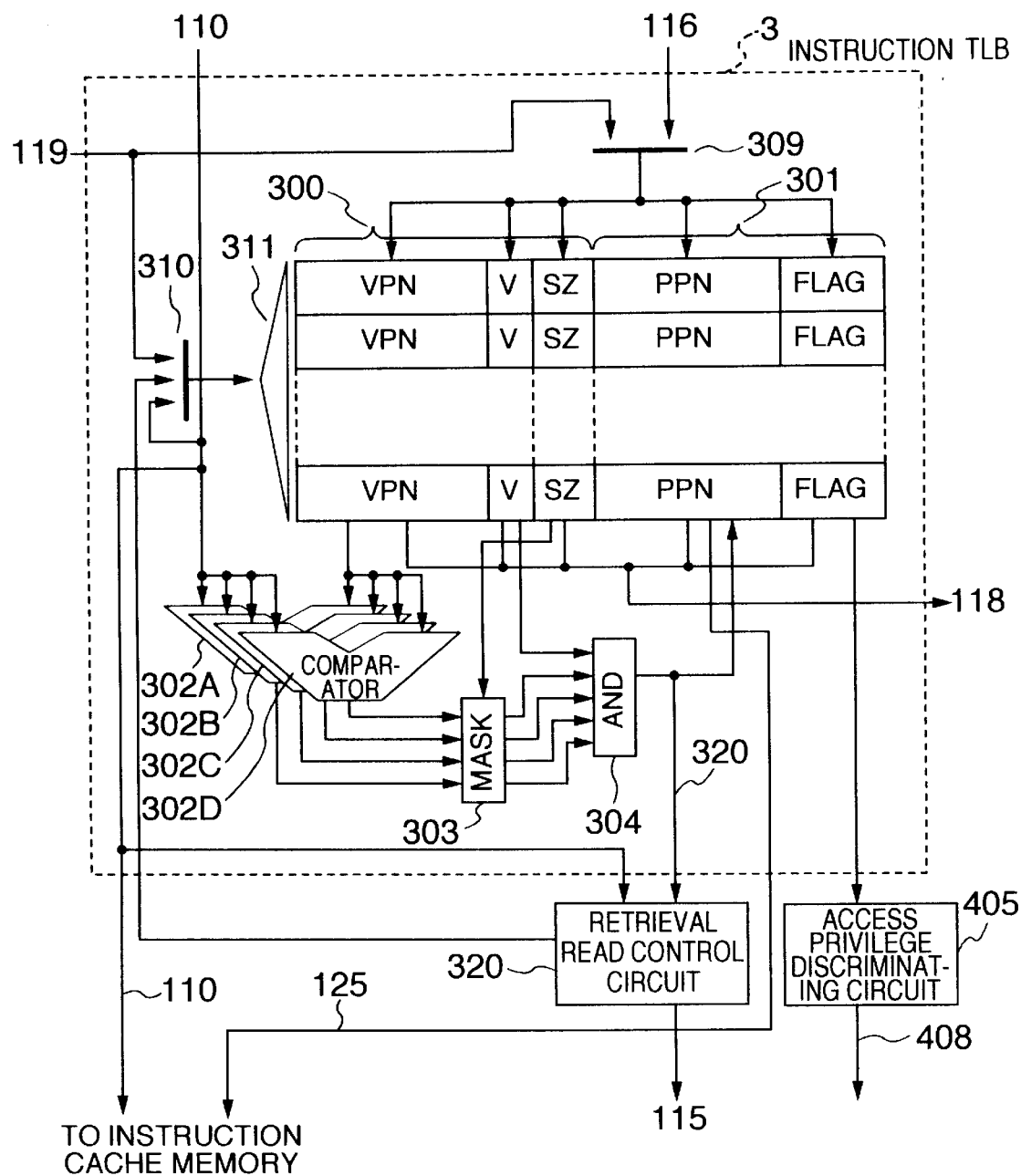
FIG. 4 is a block diagram showing an example of an instruction TLB.

FIG. 4 shows a block diagram of an example of the instruction TLB 3. The instruction TLB 3 has a memory cell array to store up to four TLB entries. The memory cell array is made up of an address array 300 and a data array 301. Although not particularly limited, one TLB entry has the virtual page number VPN, valid bit V, size bit SZ, physical page number PPN, and flag FLAG. Areas to store the virtual page number VPN, valid bit V, and size bit SZ are constructed in the address array 300. Areas to store the physical page number PPN and flag FLAG are constructed in the data array 301. The contents of the page size, valid bit V, and flag FLAG of the virtual address are not so different from those mentioned above.

Although not particularly limited, the address array 300 is constructed by a CAM and the memory cell itself has a comparing function as is well known. In the retrieving operation, the memory cells of the address array 300 are selected in parallel and execute the comparing operation. In FIG. 4, a circuit element which performs the comparing operation is conceptually shown as a comparator. Four comparators 302A to 302D typically shown indicate elements of the comparing circuit corresponding to the area in which the virtual page number of one TLB entry has been stored. Reference numeral 302A is intended to be an element for performing the comparator operation of bit 10 and bit 11 of the virtual address; 302B an element for performing the comparator operation of bit 12 to bit 15 of the virtual address; 302C an element for performing the comparator operation of bit 16 to bit 19 of the virtual address; and 302D an element for performing the comparator operation of bit 20 to bit 31 of the virtual address, respectively. When the comparison result in each of the comparing circuits 302A to 302D indicates that all of the bits coincide, a comparison result signal is set to the logic value "1".

Comparison targets by the comparators 302A to 302D are set to the corresponding bits of the virtual page number which is supplied through the signal line 110. Reference numeral 303 denotes a masking circuit and masks the comparison results by the comparing circuits 302A to 302C in accordance with the size bit SZ. That is, when the size bit SZ indicates the page of 1 kbytes, the comparison results of the comparing circuits 302A to 302C are never masked. When the size bit SZ indicates the page of 4 kbytes, the comparison result of the comparing circuit 302A is masked. When the size bit SZ indicates the page of 64 kbytes, the comparison results of the comparing circuits 302A and 302B are masked. When the size bit SZ indicates the page of 1 Mbytes, the comparison results of the comparing circuits 302A to 302C are masked. According to this example, the masked comparison result is forcedly set to the logic value "1" and is outputted from the masking circuit 303. An output of the masking circuit 303 and the valid bit V of the corresponding TLB entry are supplied to an AND circuit 304. An output of the AND circuit 304 is used as a hit/miss signal 320 of the TLB entry. Actually, the comparing circuits 302A to 302D, masking circuit 303, and AND circuit 304 are provided for each of the four storing areas of the TLB entry. Therefore, when the TLB entry including the virtual page number which is sent to the signal line 110 exists, the output of the AND circuit 304 corresponding to the TLB entry is set to the logic value "1".

The output of each of the AND circuits 304 is used as a selection signal of the corresponding TLB entry line in the data section 301. The physical page number PPN of the TLB entry line corresponding to the selection signal of the logic value "1" is outputted to the signal line 125. The flag FLAG is outputted to the access right discriminating circuit 405.

The physical page number PPN sent to the signal line 125 is supplied to the instruction cache memory 5 together with an offset (offset of the physical address) of the virtual address outputted to the signal line 110.

The output of each of the AND circuits 304 is supplied to a retrieval read control circuit 320 to instruct a retrieval reading process to the unified TLB 4. When it is decided that the outputs of all of the AND circuits 304 are equal to the logic value "0" (instruction TLB miss), the retrieval read control circuit 320 starts a control to read the necessary instruction TLB entry from the unified TLB 4. That is, the virtual page number and a necessary control signal regarding the instruction TLB miss are supplied to the unified TLB 4 through the signal line 115. Thus, the unified TLB 4 accesses the address section 400 in parallel and retrieves the TLB entry which coincides with the virtual page number sent from the signal line 115. When a retrieval result indicates the hit, all of the TLB entries (VPN, V, SZ, PPN, FLAG)

regarding the hit are supplied in parallel to the instruction TLB 3 via the signal line 116 (in this manner, the information that is outputted from the unified TLB 4 to the outside when the retrieval reading process is instructed from the instruction TLB 3 also includes the contents of the address section 400 and differs from that in case of the ordinary retrieval reading operation in the unified TLB 4). The instruction TLB 3 fetches the TLB entries which are supplied from the unified TLB 4 via a selector 309. An index address in this instance is supplied from the retrieval read control circuit 320 to an index decoder 311 through a selector 310. Although not particularly limited, when adding the TLB entries, the retrieval read control circuit 320 can replace the TLB entries by the logic of LRU.

When the retrieval result by the instruction of the retrieval reading process to the unified TLB 4 from the instruction TLB 3 indicates the retrieval miss, a TLB miss exception is notified to the CPU 2 by the TLB miss discriminating circuit 406. Thus, the CPU 2 adds the entries regarding the TLB miss exception to the unified TLB 4 from the translation lookaside table of the external memory (not shown) as mentioned above. After completion of the exceptional process, the interrupted instruction is again executed, so that a retrieval hit is obtained in the unified TLB 4. Consequently, the TLB entries necessary for the instruction TLB 3 are supplied to the instruction TLB 3 through the signal line 116 as mentioned above.

When the TLB entries are added to the instruction TLB 3, the TLB entries to be added are fetched from the signal line 116 to the address section 300 and data section 301 by the selector 309. The selection of the TLB entry line at this time is performed by fetching the index address which is supplied from the retrieval read control circuit 320 by the selector 310 and by decoding it by the index decoder 311. Although not particularly limited, the retrieval read control circuit 320 performs the selection control for the selectors 309 and 310.

Although the details will be explained hereinlater, the index address for the TLB entry selection in the self test is transmitted from the signal line 119 through the selector 310. The write data in the self test is supplied from the signal line 119 via the selector 309. The reading operation in the self test is performed to one whole TLB entry which was indexed. All of the indexed TLB entry are supplied to the signal line 118.

[Address translation in the instruction access]

Figure 5:
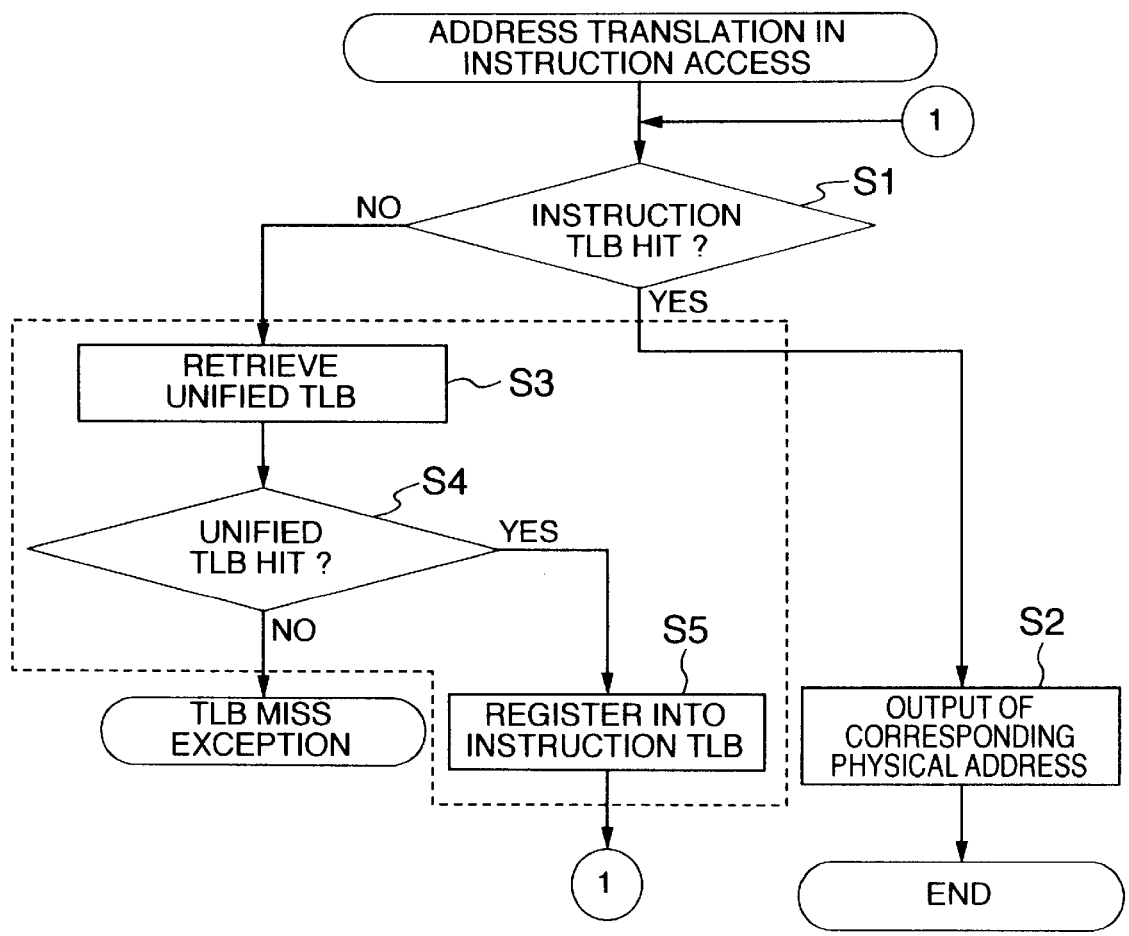
FIG. 5 is a flowchart showing a procedure of an address translating process in an instruction access.
Figure 6:
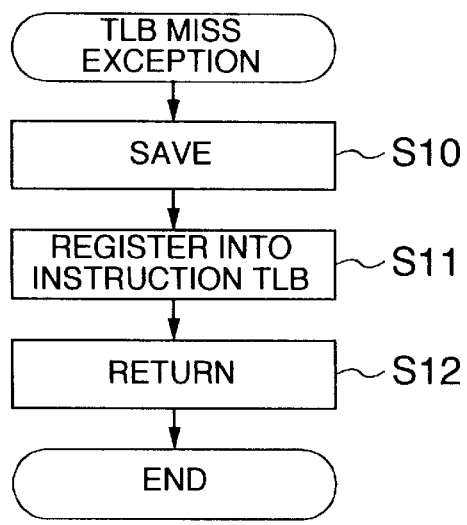
FIG. 6 is a flowchart showing an outline of an exceptional process to a TLB miss.

A procedure of an address translating process in an instruction access will now be described with reference to FIGS. 5 and 6. When the instruction access by the CPU 2 is activated (start of the instruction fetching by the CPU 2), the instruction TLB 3 retrieves the presence or absence of the TLB entry according to the instruction address and discriminates whether there is a retrieval hit or miss (S1). When there is a retrieval hit, the physical address corresponding to the virtual address is outputted (S2). When there is a retrieval miss in step S1, the unified TLB 4 retrieves the presence or absence of the TLB entry according to the instruction address in accordance with an instruction from the retrieval read control circuit 320 (S3), thereby discriminating about the retrieval hit or miss (S4). When there is a retrieval hit, the TLB entry corresponding to the virtual page number of the instruction address is registered into the instruction TLB 3. After it was registered, the processing routine is returned to S1. When a discrimination result in step S4 indicates the retrieval miss, the TLB miss exception is generated by the TLB miss discriminating circuit 406. When the TLB miss exception is generated, the CPU 2 interrupts the present process and executes a saving process (S10), subsequently registers the TLB entry of the virtual page number regarding the miss into the unified TLB 4 (S11), and finally performs a return process (S12). After completion of the return, the processing routine is returned to the process in step S1 in FIG. 5. As mentioned above, the processes S3, S4, and S5 for the retrieval miss of the instruction TLB 3 are processed by the hardware mishandling for the TLB miss.

[Data cache memory]

Figure 7:
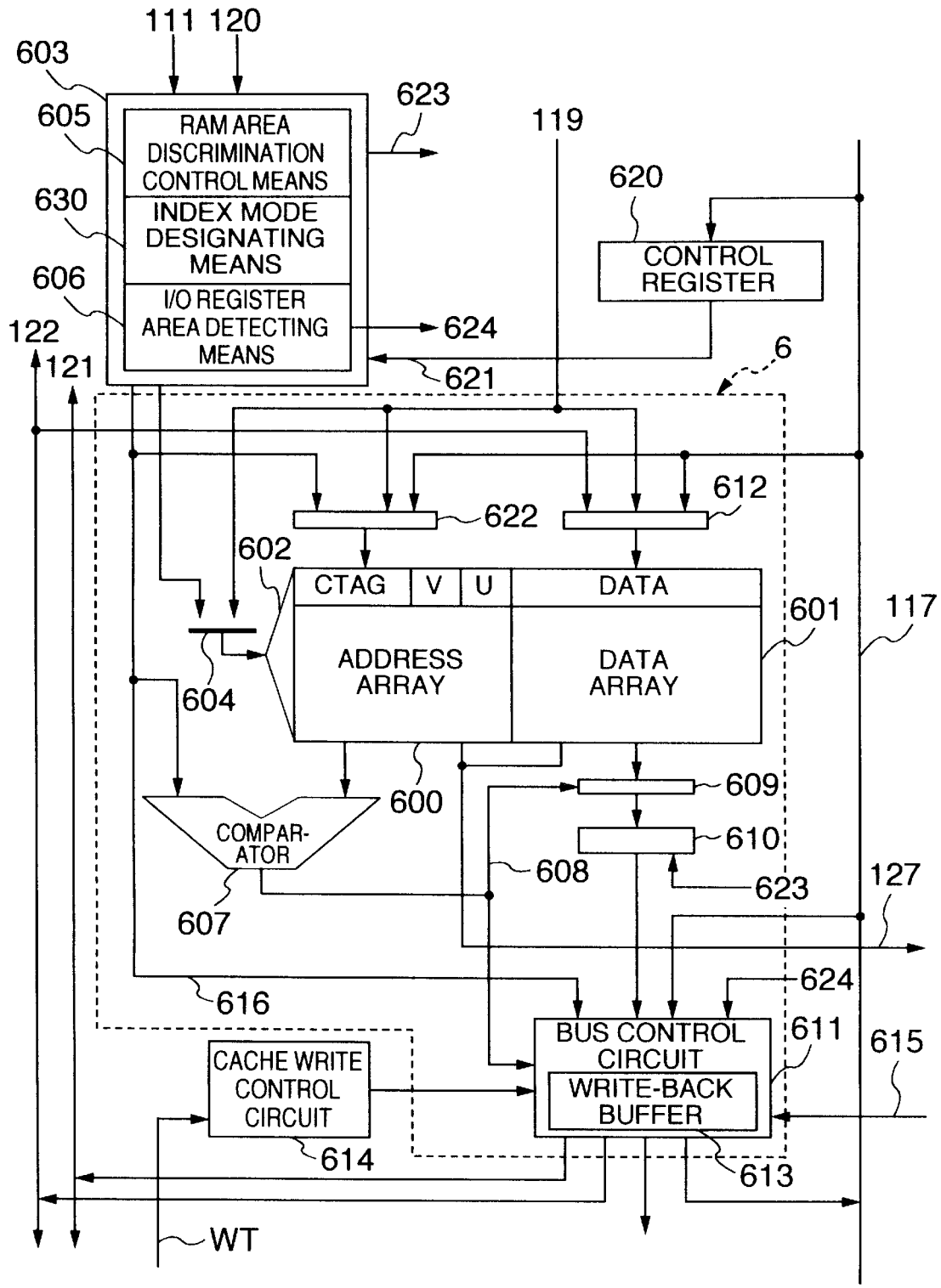
FIG. 7 is a block diagram showing an example of a data cache memory.

FIG. 7 shows an example of the data cache memory 6. The data cache memory 6 has a memory cell array to construct up to 512 cache lines. The memory cell array is made up of an address array 600 and a data array 601. One cache line includes a cache tag (address tag) CTAG constructed by the physical page number, a valid bit V, a dirty bit U, and data DATA of 32 bytes corresponding to it. The cache tag CTAG, valid bit V, and dirty bit U are arranged in the address array 600. The data DATA is arranged in the data section 601. The valid bit V indicates whether valid data is included in the cache line or not. When the valid bit V is equal to the logic value "1", it means that the data is valid. When it is equal to "0", it means that the data is invalid. The dirty bit U is used when the data cache memory 6 is used in the write-back mode. When the writing occurs in the write-back mode, the dirty bit U is set to the logic value "1". The dissidence of the data of the corresponding entry and the data in the external memory can be known by the dirty bit U. The dirty bit U is initialized to the logic value "0" by a power-on reset.

Although not particularly limited, the data cache memory 6 is used for direct mapping. The selection of the cache line is performed by an index decoder 602. The index address is supplied from a control circuit 603 through a selector 604. The control circuit 603 performs a control to distribute, to each section, the virtual addresses which are supplied from the signal line 111 and the physical page numbers which are supplied from the signal line 120. The control circuit 603 also has RAM area discrimination control means 605, index mode designating means 630, and I/O register area detecting means 606, which will be explained in detail hereinlater.

The cache tag of the indexed cache line is compared with the corresponding physical page number by a comparator 607. The physical page number is supplied from the unified TLB 4 through the signal line 120. When the cache tag CTAG and the physical page number coincide and the valid bit V is equal to the logic value "1", a cache hit signal 608 which is outputted from the comparator 607 is set to the logic value "1" (cache hit). When the cache hit is notified by the cache hit signal 608, a gate 609 allows the data of the indexed cache line to pass to the post stage. A part of the data which was allowed to pass through the gate 609 by the cache hit is selected by a selector 610 and is supplied to a bus control circuit 611. The selector 610 executes the selecting operation by using a part of the offset address. Such a part of the offset address is extracted by the control circuit 603 and is supplied via a signal line 623.

The bus control circuit 611 is connected to an output of the selector 610, CPU bus 117, cache data bus 122, cache address bus 121, and the like. Further, the cache hit signal 608, the physical address from a signal line 616, a read signal and write signal 615 from the CPU 2, and the like are supplied to the bus control circuit 611. The bus control circuit 611 executes a control for outputting the read-out data regarding the cache hit which is outputted from the selector 610 to the CPU bus 117, a control for outputting the physical address for the external memory access to the cache address bus 121 at the time of the cache miss, a control for writing (cache fill) the data from the external memory through a selector 612, a control for writing the cache tag CTAG to the address section of the cache-filled cache line through a selector 622, a control for outputting the data to the cache data bus 122 and for outputting a write-back destination address to the cache address bus 121 when the data is written back to the external memory, and the like. In addition to the logic for the above controls, the bus control circuit 611 includes a write-back buffer 613. When a necessity to sweep out the dirty cache entry (cache line of U=1) to the external memory occurs due to the cache miss, the write-back buffer 613 is a data buffer to store the entry to be swept out in order to improve the performance while preferentially performing the cache filling operation. The write-back buffer 613 has the data as much as one entry of the cache and the storing area of the physical address of the sweep-out destination.

A cache write control circuit 614 controls the write-through mode and the write-back mode for the data cache memory 6. Any one of the operating modes to control is determined by the cache write mode bit WT included in the TLB entry.

The control contents by the bus control circuit 611 and cache write control circuit 614 will now be separately described with respect to the associated reading operation and the associated writing operation.

When a reading request of the data is issued from the CPU 2 to the area which can be cached, the cache line is selected by the index address shown by a part of the virtual addresses. The cache tag CTAG is read out from the selected cache line. The read-out cache tag is compared with the physical page number which is supplied from the unified TLB 4. When the cache tag coincides and the valid bit V is equal to the logic value "1", it is determined that there is the cache hit. For example, data of a long word is outputted from the selector by using a part of the offset of the virtual address. The read-out data is supplied to the CPU bus 117 by the bus control circuit 611. When the tag address doesn't coincide or the valid bit V is equal to the logic value "0", it is decided that there is the cache miss. The bus control circuit 611 reads out the data as much as one entry of the cache from the external memory corresponding to the physical address according to the miss via the selector 612. Such a data reading operation is called a cache fill. After the necessary data was stored into the data array 601 by the cache fill, by setting the valid bit V of the cache line to the logic value "1", the cache tag CTAG is updated. The necessary data is returned to the CPU 2. When the cache entry to be swept out from the cache data array 601 is dirty at the time of the cache fill, the dirty cache entry is swept out to the write-back buffer 613. After that, the cache fill is performed. The write-back to the external memory from the write-back buffer 613 is executed after completion of the cache fill.

When a writing request of data is generated from the CPU 2 to the area which can be cached, a discrimination about the cache hit is performed in a manner similar to the reading operation. In case of the cache hit, when the write-back mode is instructed, the data is written into the hit cache entry and the dirty bit U is set to U=1. In the write-through mode, after the data was written into the hit entry, the data is written into the external memory. In this case, the operation for the dirty bit U is not executed. In case of the cache miss, in the write-back mode, the cache fill is executed, the valid bit V is set to V=1, the dirty bit U is set to U=1, the cache tag is updated, and the writing to the data cache memory is performed. In case of the write-through mode, the writing is executed to only the external memory in the cache miss. The cache fill is not executed. When the cache miss occurs in the write-back mode, the process in the case where the entry to be swept out by the cache filling operation is dirty is substantially the same as that in the reading operation.

The data cache memory 6 has an RAM mode and an index mode. The RAM mode is an operating mode for enabling the half of the data array 601 to be accessed at random as an RAM. In the RAM mode, cache entries 0 to 127 and 256 to 383 are made function as cache memories. Cache entries 128 to 255 and 384 to 511 are enabled to be accessed at random. The index mode is an operating mode for dividing the cache by switching the bit position of the virtual address to select the cache line and for allocating to a virtual address space. The RAM mode and the index mode are respectively independently selected by setting a predetermined control bit in a control register 620 to "1". In a case other than the RAM mode and the index mode, all of the address array 600 and data array 601 are used as cache memories.

Figure 8:
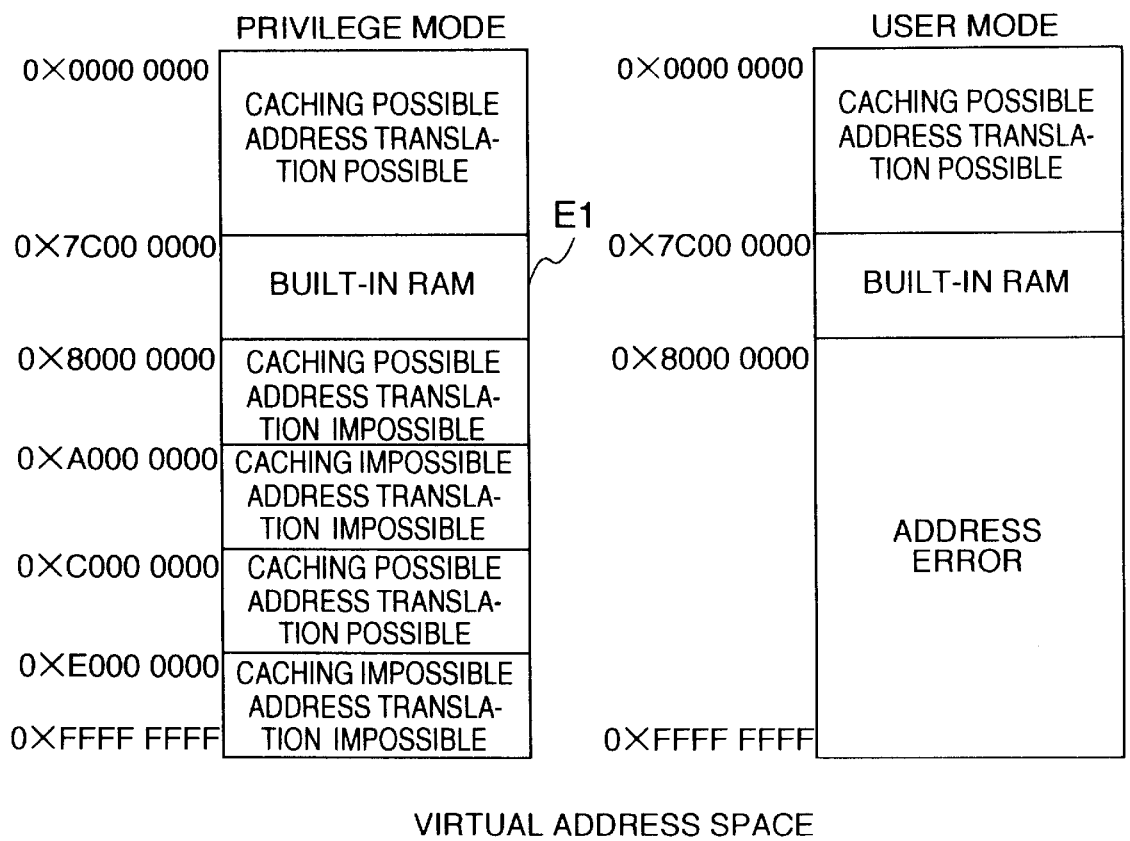
FIG. 8 is an address map of a virtual address space.

As disclosed in FIG. 8 showing the virtual address space of the data processor 1, the RAM areas in the data cache memory have been mapped to 0x7C00 0000 to 0x7FFF FFFF. 0x denotes a hexadecimal notation.

Figure 9:
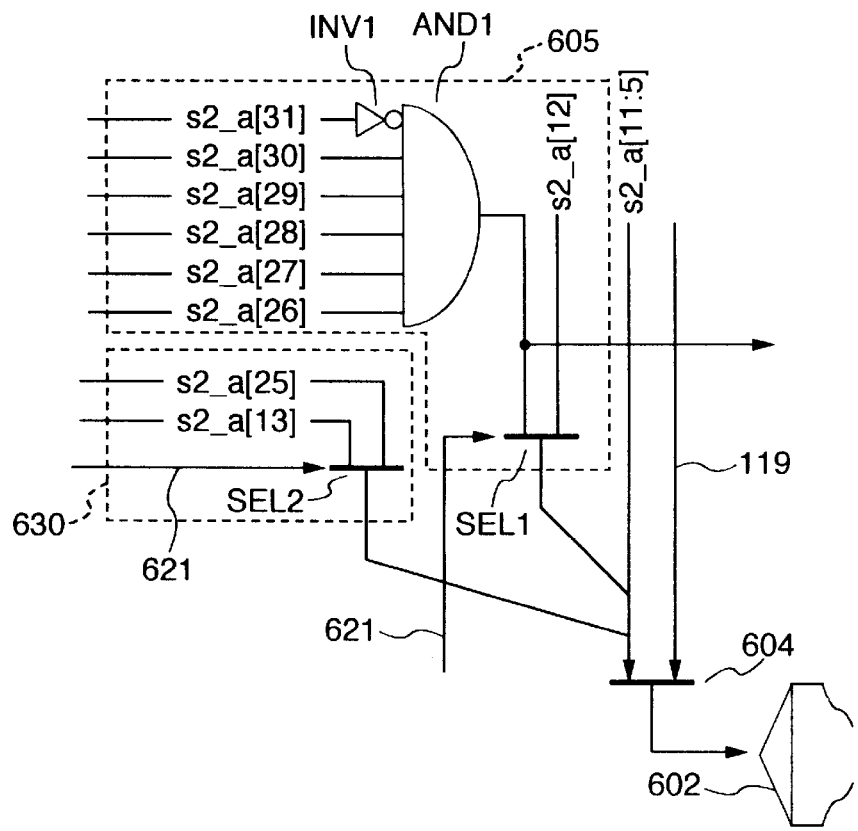
FIG. 9 is a block diagram showing an example of RAM area discrimination control means and index mode designating means.

The RAM area discrimination control means 605 switches the random accessing operation for the RAM areas and the operation as a cache memory. For example, as shown in FIG. 9, an inverter INV1 and a 6-input AND gate AND1 are provided in order to detect 0x7C by upper six bits s2_a[31] to s2_a[26] of the virtual address. In FIG. 9, s2_a[13] to s2_a[5] are nine bits included in the virtual address and are regarded as an address for an index. Either one of an output of the AND gate and an address bit s2_a[12] is selected by a selector SEL1. The selecting operation of the selector SEL1 is controlled by a control signal 621. The control signal 621 is set to the logic value according to one bit in the control register 620 and this one bit is a control bit to designate the RAM mode. When the RAM mode is designated, the selector SELL selects the output of the AND gate. The output of the AND1 gate is set to the logic value "1" only when the upper six bits s2_a[31] to s2_a[26] of the virtual address are 0x7C and is set to the logic value "1" in the other cases. In the RAM mode, therefore, when the upper six bits s2_a[31] to s2_a[26] of the virtual address are equal to 0x7C, the areas of entries 128 to 255 and 384 to 511 in the address array 600 and data array 601 are used as targets of the index. In the other addresses, the areas of entries 0 to 127 and 256 to 383 are used as targets of the index. In the RAM mode, when the output signal of the AND1 gate is equal to the logic value "1", the gate 609 and bus control circuit 611 mask the cache hit signal 608. The selector 610 and bus control circuit 611 on the data array 601 side enables the random reading operation on a 32-bit unit basis from the data array 601 by using the remaining parts s2_a[23] to s2_[14] and s2_a[4] to s2_a[2] of the virtual address. When the random writing operation is performed to the data array 601, the write data is supplied from the CPU bus 117 through the selector 612. The bus control circuit 611 executes the control of the selector 612 in the random writing operation by using the partial virtual address s2_a[23] to s2_a[14] and s2 a[4] to s2_a[2] in a manner similar to the random reading operation.

Since the random access in the RAM mode is the direct access to the RAM areas mapped to the virtual space, the access is executed between the CPU bus 117 and the CPU 2. Even when the RAM mode is set, as for the data cache memory 6, the caching operation can be still performed by using the half storing areas in the data cache memory 6 in response to the memory access except for the RAM areas. Whether the operation is the RAM operation or the caching operation is determined on the basis of the output of the AND gate AND1 in FIG. 9 in accordance with the above description.

The index mode designating means 630 switches the bit position of the virtual address to select the cache line, thereby dividing the cache and allocating to the virtual address space. For example, as shown in FIG. 9, the 25th bit s2_a[25] and the 13th bit s2_a[13] of the virtual address are selected by a selector SEL2. When the RAM mode is not used, an output of the selector SEL2 is used together with s2_a[12] to s2_a[5] of the virtual address for the index. The selecting operation of the selector SEL2 is controlled by the control signal 621. The control signal 621 is set to the logic value according to one bit in the control register 620. This one bit is a control bit to designate the index mode. When the index mode is designated, the selector SEL2 selects s2_a [25]. When the index mode is not designated, s2_a[13] is selected. When the index mode is designated, since s2 a[25] is used for the index, the upper side and the lower side of the data cache are separately used every 32 Mbytes. By arranging the program to a boundary of 32 Mbytes, the data cache can be falsely handled in a 2-way set-associative manner.

Figure 10:
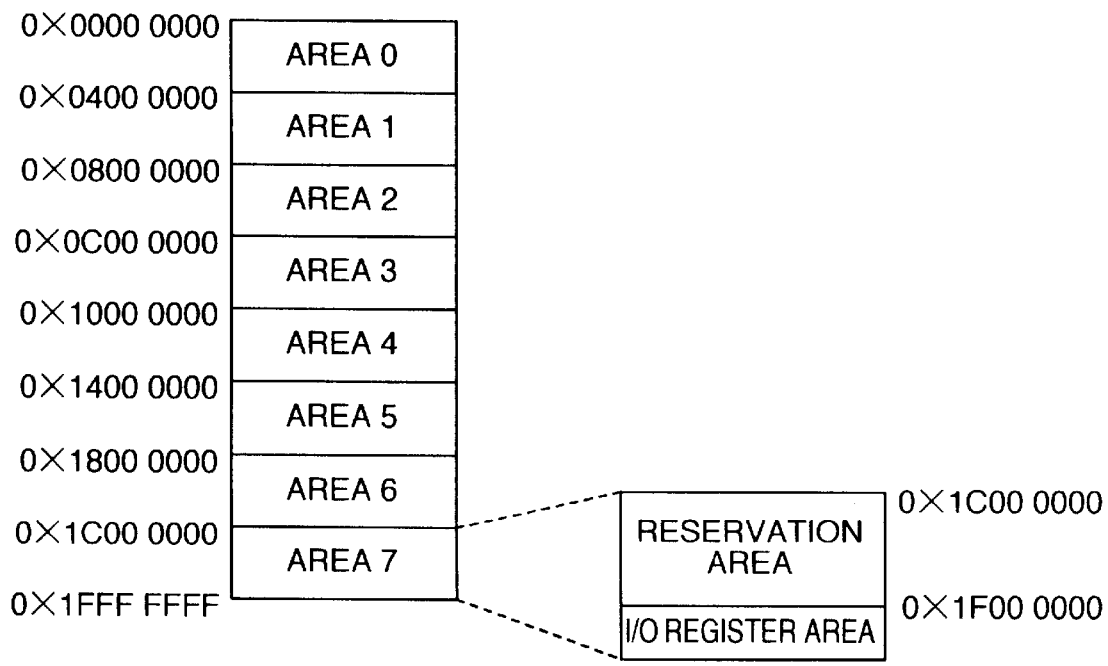
FIG. 10 is an address map of a physical address space.

The I/O register area discriminating means 606 discriminates whether the physical page number which is supplied from the unified TLB 4 coincides with the page number allocated to an I/O register area or not. That is, in the data processor 1, as shown in an example in FIG. 10, 0×1F00 0000 to 0×1FFF FFFF in the physical address space are allocated to the I/O register area. The I/O register area is an area to which a register included in the peripheral module 8, a register such as a control register 620 included in the data cache memory 6, or the like is allocated. The I/O register area denotes that a register such as a general register of the CPU 2 or a register such as a floating point register in the case where the data processor includes a floating point unit is excluded. As mentioned above, the I/O register area is a register area having a nature such that it is accessed by designating the address to which it was mapped. The I/O register area detecting means 606 discriminates whether all of the upper five bits of the physical page number which is outputted as a result of the associated-hit due to the unified TLB 4 are equal to the logic value "1" (0×1F) or not. When it is detected that the access is an access to the I/O register space, they are supplied to the bus control circuit 611 by a signal 624. Thus, the bus control circuit 611 inhibits the input and output of the data by the caching operation (associative retrieving operation) of the data cache memory 6 and executes a bus control for directly accessing the I/O register. In this bus control, the physical address which is supplied to the bus control circuit 611 through the unified TLB 4 is used. In this instance as well, since the access privilege protecting circuit 405 described in FIG. 2 monitors protection information (included in the FLAG) included in the TLB entry, the storage protection can be also performed to the I/O register space. As mentioned above, by mapping the I/O register area (I/O register space) from the virtual address space (address space on the virtual memory) to the physical address space (address space on the physical memory), the storage protection can be also performed to the I/O register space.

In the self testing mode, the write data and the address signal are supplied to the data cache memory 6 via the signal line 119. The address signal is supplied to the index decoder 602 through the selector 604. The write data is supplied to the data array 601 and address array 600 via the selectors 612 and 622. The read-out data from the address array 600 and data array 601 is supplied to the self testing circuit 9 through the dedicated signal line 127.

[Instruction cache memory]

Figure 11:
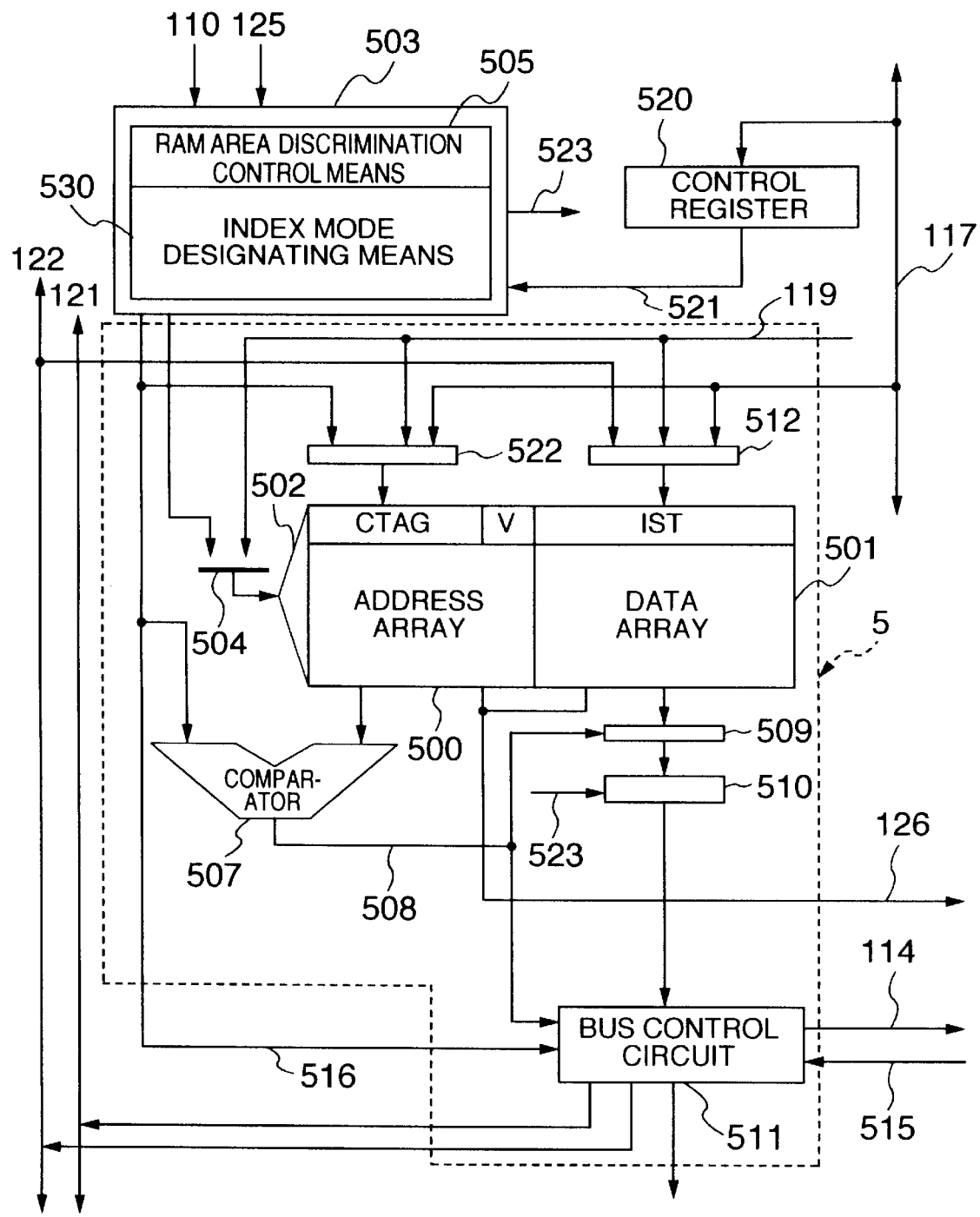
FIG. 11 is a block diagram showing an example of an instruction cache memory.

FIG. 11 shows an example of the instruction cache memory 7. A fundamental construction of the instruction cache memory 5 is substantially the same as that of the data cache memory 6 except for a point that it doesn't have the switching function of the write-back/write-through and the direct accessing function to the I/O register area. A point different from the data cache memory 6 will now be mainly described.

The instruction cache memory 5 has a memory cell array to construct up to 256 cache lines and the memory cell array is made up of an address array 500 and a data array 501. One cache line includes the cache tag (address tag) CTAG constructed by the physical page number, valid bit V, and 16 instructions ISTs corresponding to it. The cache tag CTAG and valid bit V are arranged in the address array 500. The instructions ISTs are arranged in the data array 501.

Although not particularly limited, the instruction cache memory 5 is used for direct mapping. The selection of the cache line is performed by an index decoder 502. The index address is supplied from a control circuit 503 through a selector 504. The control circuit 503 controls so as to distribute the virtual address which is supplied from the signal line 110 and the physical page numbers which are supplied from the signal line 125 to each section. The control circuit 503 has RAM area discrimination control means 505 and index mode designating means 530.

The cache tag of the indexed cache line is compared with the corresponding physical page number by a comparator 507. The physical page number is supplied from the instruction TLB 3 through the signal line 125. When the cache tag coincides with the physical page number and the valid bit V is equal to the logic value "1" (cache hit), a cache hit signal 508 which is outputted from the comparator 507 is set to the logic value "1". When the cache hit is notified by the cache hit signal 508, a gate 509 allows the data of the indexed cache line to pass to the post stage. A part of the data which was allowed to pass through the gate 509 due to the cache hit is selected by a selector 510 and is supplied to a bus control circuit 511. The selector 510 executes the selecting operation by using a part of the offset address. Such a part of the offset address is extracted by the control circuit 503 and supplied via a signal line 523.

The bus control circuit 511 is connected to an output of the selector 510, CPU bus 117, cache data bus 122, cache address bus 121, signal line 114, and the like. Further, the cache hit signal 508, the physical address from a signal line 516, a read signal and write signal 515 from the CPU 2, and the like are supplied to the bus control circuit 511. The bus control circuit 511 executes a control for outputting the read-out data regarding the cache hit which is outputted from the selector 510 to the signal line 114, a control for outputting the physical address for the external memory access to the cache address bus 121 at the time of the cache miss, a control for writing (cache fill) the data from the external memory through a selector 512, a control for writing the cache tag CTAG to the address section of the cache-filled cache line via a selector 522.

The control contents by the bus control circuit 511 will now be described. When a reading request of the instruction is generated from the CPU 2 to the area which can be cached, the cache line is selected by the index address shown by a part of the virtual address. The cache tag is read out from the selected cache line. The read-out cache tag is compared with the physical page number which is supplied from the instruction TLB 3. When the cache tag coincides and the valid bit V is equal to the logic value "1", it is determined that there is a cache hit. For example, the data of a long word is outputted from the selector 510 by using a part of the offset of the virtual address. The read-out data is supplied to the CPU 2 via the signal line 114 by the bus control circuit 511. When the tag address doesn't coincide or the valid bit V is equal to the logic value "0", it is decided that there is a cache miss. The bus control circuit 511 reads the data as much as one entry of the cache from the external memory corresponding to the physical address regarding the miss via the selector 512. This data reading operation is called a cache fill. After the necessary data was stored into the data array 501 due to the cache fill, by setting the valid bit V of the cache line to the logic value "1", the cache tag CTAG is updated through the selector 522 and the necessary data is returned to the CPU 2. Since there is no instruction writing upon instruction fetching of the CPU 2, even if the old cache entry has been swept out from the instruction cache memory 5 at the time of the cache fill, there is no need to write back to the external memory.

The instruction cache memory 5 also has an RAM mode and an index mode similar to those mentioned above. When the RAM mode is set, the half of the data array 501 is enabled to be accessed at random as an RAM. In the RAM mode, cache entries 0 to 63 and 128 to 191 are allowed to function as a cache memory and cache entries 64 to 127 and 192 to 255 are enabled to be accessed at random. The RAM mode and the index mode are respectively independently selected by setting a predetermined control bit in a control register 520 to "1". In the other cases, all of the address array 500 and data array 501 are used as cache memories.

As disclosed in FIG. 8 showing the virtual address space of the data processor 1, the RAM areas in the instruction cache memory have been mapped to 0×7C00 0000 to 0×7FFF FFFF. 0× denotes the hexadecimal notation.

The RAM area discrimination control means 505 switches the random accessing operation for the RAM areas and the operation as a cache memory. Although its logic can be constructed in a manner similar to FIG. 9, since the number of cache lines is the half of the number of data caches, the position of the index is shifted to a lower position by one bit. The setting of the operating mode is determined by one bit in the control register 520. The value of this bit is supplied to the RAM area discrimination control means 505 by a control signal 521. When the RAM mode is designated, in the case where upper six bits of the virtual address are equal to 0×7C, the areas of entries 64 to 127 and 192 to 255 in the address array 500 and data array 501 are set to the targets of the index. In the other address, the areas of entries 0 to 63 and 128 to 191 are set to the targets of the index. In the RAM mode, so long as the access address indicates the RAM area, the gate 509 and bus control circuit 511 mask the cache hit signal 508 and the selector 510 and bus control circuit 511 enable the random reading operation on a 32-bit unit basis from the data array 501.

Since the random access in the RAM mode is the direct instruction access to the RAM areas mapped to the virtual space, the access is executed between the signal line 114 and the CPU 2. Even when the RAM mode is set, as for the instruction cache memory 5, the caching operation can be still performed by using the half storing areas in the instruction cache memory 5 in response to the memory access except for the RAM areas.

The index mode designating means 530 switches the bit position of the virtual address to select the cache line, thereby dividing the cache and allocating to the virtual address space. Although its logic can be constructed in a manner similar to FIG. 9, since the number of cache lines is the half of the number of data caches, the position of the index is shifted to a lower position by one bit.

The selecting operation of the index mode is controlled by the control signal 521. The control signal 521 is set to the logic value according to one bit in the control register 520 and such one bit is a control bit to designate the index mode. When the index mode is designated, since the 25th bit of the virtual address is used for the index, the upper side and the lower side of the instruction cache are separately used every 32 Mbytes. By arranging the program to a boundary of the 32 Mbytes, the instruction cache can be falsely handled in a 2-way set-associative manner.

In the self testing mode, the write data and the address signal are supplied to the instruction cache memory 5 via the signal line 119. The address signal is supplied to the index decoder 502 through the selector 504. The write data is supplied to the data array 501 and address array 500 via the selectors 512 and 522. The read-out data from the address array 500 and data array 501 is sent to the self testing circuit 9 through the dedicated signal line 126.

[Self testing circuit]

Figure 12:
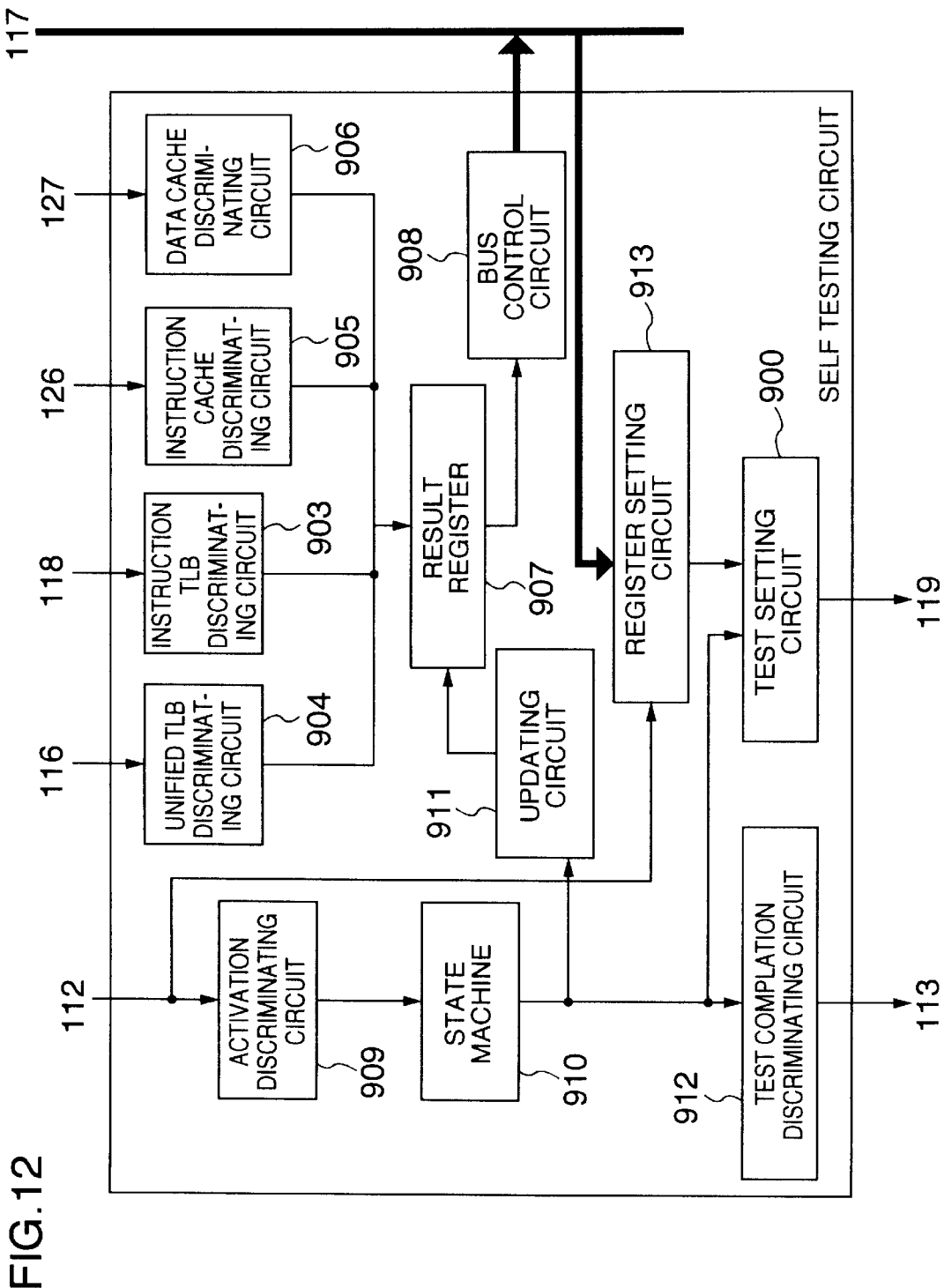
FIG. 12 is a block diagram showing an example of a self testing circuit.

FIG. 12 shows a block diagram of the self testing circuit 9. According to the self testing circuit 9, a test setting circuit 900 writes test data into the instruction TLB 3, unified TLB 4, instruction cache memory 5, and data cache memory 6 and supplies the written data to an instruction TLB discriminating circuit 903, a unified TLB discriminating circuit 904, an instruction cache discriminating circuit 905, and a data cache discriminating circuit 906, respectively. Each of the discriminating circuits 903 to 906 discriminates a coincidence between, for example, the corresponding write data and the read-out data. Discrimination results are held in a result register 907 and can be read out by the CPU 2 via a bus control circuit 908.

An activation discriminating circuit 909 discriminates the activation of the self test by a signal 112 from the CPU 2. When the activation of the self test is instructed, the activation discriminating circuit 909 activates a state machine 910 and sequentially repeats a control cycle for a testing operation. The test control circuit 900 activates a writing cycle and a reading cycle for the instruction TLB 3, unified TLB 4, instruction cache memory 5, and data cache memory 6 synchronously with the control cycle and controls the discriminating operations of the instruction TLB discriminating circuit 903, unified TLB discriminating circuit 904, instruction cache discriminating circuit 905, and data cache discriminating circuit 906, respectively. After the discrimination results of one time were read to the CPU 2, the result register 907 is updated to an initial value by an updating circuit 911 and those operations are repeated to the end. A test completion discriminating circuit 912 discriminates the completion of the self test on the basis of an output of the state machine 910. A discrimination result is returned to the CPU 2 by a signal 113. A register setting circuit 913 executes the setting of test conditions such as write data, write address, and the like to the test setting circuit 900.

[Data processing system]

Figure 13:
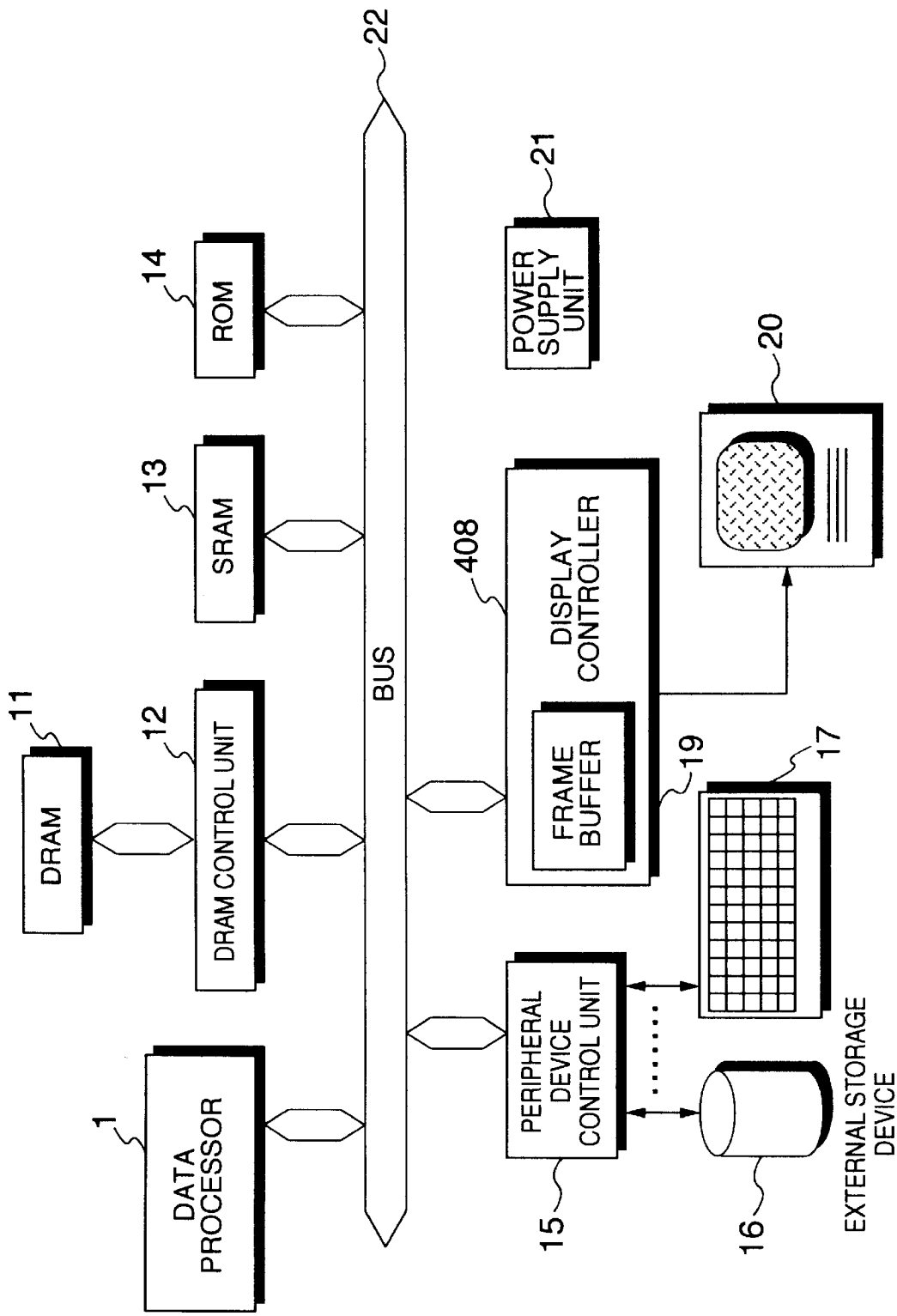
FIG. 13 is a block diagram showing an example of a data processing system to which the data processor of FIG. 1 is applied.

FIG. 13 shows an example of a data processing system to which the data processor 1 is applied. In the diagram, reference numeral 1 denotes the data processor; 11 a dynamic random access memory (DRAM); 12 a DRAM control unit for performing an address multiplexing control and a refreshing control to the DRAM 11; and 13 an SRAM. The SRAM 13 is used as a work area of the data processor 1, a temporary storing area of data, or the like. Reference numeral 14 denotes an ROM having an OS (Operating System) or the like of the data processor 1; 15 a peripheral device control unit to which an external storage device 16 and a keyboard 17 which are typically shown are connected; 18 a display controller which has a frame buffer 19 and a drawing and display control logic circuit (not shown) and executes a drawing control and a display control to a display 20; 21 a power supply circuit; and 22 a bus which is typically shown.

The DRAM 11, SRAM 13, ROM 14, and the like construct external memories of the data processor 1. The external storage device 16 is used as a secondary storage of the external memories. An address translation table is formed in, for example, the SRAM or DRAM.

[Superiority of data processor]

According to the data processor 1 described above, the translation lookaside buffers (TLBs) 3 and 4 are divided into the buffer for data and the buffer for instruction and the address translation information for instruction is also stored into the translation lookaside buffer 4 for data. When a translation miss occurs in the translation lookaside buffer 3 for instruction, new address translation information is fetched from the translation lookaside buffer 4 for data. Therefore, when a translation miss occurs in the translation lookaside buffer 3 for instruction, the new address translation information is fetched from the translation lookaside buffer 4 for data, so that a high speed of the address translating operation can be realized as compared with the case of obtaining the address translation information from the external address translation table each time the translation miss occurs. Thus, a high memory accessing speed can be accomplished.

Only a partial area in the cache memories 5 and 6 can be also selectively made operative as a random access memory. According to this construction, the RAM areas in the data cache memory 6 and instruction cache memory 5 are accessed at random. Since the remaining areas in both of the cache memories 5 and 6 are made operative as cache memories in which the associative retrieval is performed, particularly, both of a condition such that desired instruction and data which need a high accessing speed are always held in the cache memories 5 and 6 and a condition such that the instruction and data which were used recently are held in the cache memories 5 and 6 can be satisfied. It is possible to contribute to the improvement of the data processing speed.

The index addresses to select the lines of the cache memories 5 and 6 can be switched. Thus, since the bits on the further upper side of the virtual address can be selectively used for selection of the lines of the cache memories, the cache of the direct mapping can be falsely treated as a set-associative cache. It is possible to contribute to the improvement of the data processing speed.

The I/O register area is mapped from the virtual address space to the physical address space. In this instance, the TLB entry has protection information to specify an access right to the page. The access right discriminating circuit 405 discriminates an access right to the relevant page on the basis of the protection information of the translation information regarding the associated hit. Therefore, a storage protection can be performed even for the I/O register space.

The entry of the unified TLB 4 has the cache write mode bit WT to specify which one of the write-through and the write-back is used for the data cache memory 6. The cache write control circuit 614 determines a control mode of the cache write with reference to the cache write mode bit WT on a page unit basis. In case of the write-through mode, although the contents in the cache memory and the external memory always coincide, the number of times of access to the external memory increases. In the write-back mode, although the number of external memory accessing times is small, a period of time during which the contents in the cache memory and the external memory don't coincide exists. In the case where a plurality of cache memories unify the external memory, there is a case where a consistency between the cache memory and the external memory cannot be held. Since the write-through mode or the write-back mode can be selected on a page unit basis, the relation between the consistency of the cache memory and the external memory and the accessing speed can be optimized in accordance with the system construction and the contents of the process.

In the data processing system to which the data processor 1 is applied, therefore, a data processing efficiency can be improved. In a point of a using mode or the like of the cache memory, the invention can be applied to various systems of different requests.

Although the invention made by the present inventors has specifically been described above on the basis of the embodiments, the invention is not limited to them but many modifications and variations are possible within the scope of the spirit of the invention.

For instance, the instruction TLB and unified TLB can be also constructed in a direct mapping mode or a set-associative mode. The set-associative mode can be also used with respect to the data cache memory and the instruction cache memory. The data bus for the self test which is connected to the instruction TLB or the like is not always constructed as a dedicated bus but can be also commonly used by a gate control or the like. The data processor can also has another circuit module such as a floating point unit or the like.

Effects which are derived by a typical one of the invention disclosed in the present invention will now be briefly described as follows.

That is, when the translation miss occurs in the translation lookaside buffer for instruction, the new address translation information is fetched from the translation lookaside buffer for data. Therefore, as compared with the case of obtaining the address translation information from the external address translation table each time the translation miss occurs, a higher speed of the address translating operation can be realized. Thus, a high memory accessing speed can be accomplished.

Partial storing areas in the data cache memory and the instruction cache memory can be accessed at random and the cache memory operation by the associated retrieval can be performed in the remaining storing areas. Therefore, particularly, both of a condition such that desired instruction and data which need the high accessing speed are always held in the cache memory and a condition such that the instruction and data which were used recently are held in the cache memory can be satisfied. It is possible to contribute to the improvement of the data processing speed.

Since the designated bits of the index address can be switched in the data cache memory and the instruction cache memory, the cache memory can be divided and used every large address space. It is possible to contribute to the improvement of the data processing speed.

By mapping the I/O register area from the virtual address space to the physical address space, the storage protection can be also performed to the I/O register space.

Since the write-through mode and the write-back mode can be selected on a page unit basis, the relation between the consistency of the cache memory and the external memory and the accessing speed can be optimized in accordance with the system construction and the contents of the process.

We claim:

1. A data processor, comprising:
   a central processing unit;
   a first translation lookaside buffer in which a part of address translation information for translating a virtual address treated by said central processing unit to a physical address is stored and which associatively retrieves, from the address translation information, a physical page number corresponding to a virtual page number outputted by said central processing unit;

a second translation lookaside buffer in which address translation information regarding an instruction address out of the address translation information possessed by said first translation lookaside buffer is stored and which associatively retrieves, from the address translation information, a physical page number corresponding to the virtual page number that is outputted by said central processing unit upon instruction fetching said second translation lookaside buffer being coupled to said first translation buffer; and a buffer control circuit which, when associative retrieval with respect to a virtual page number in said second translation lookaside buffer results in a retrieval miss, a virtual page number concerned with the retrieval miss is applied to said first translation lookaside buffer for an associative retrieval therein and the address translation information for said associative retrieval in said first translation lookaside buffer with respect to said virtual page number concerned with the retrieval miss is supplied to said second translation lookaside buffer.

2. A data processor according to claim 1, wherein when the result of the associative retrieval with respect to a virtual page number in said second translation lookaside buffer results in the retrieval miss and the virtual page number concerned with the retrieval miss is applied to said first translation lookaside buffer for associative retrieval resulting in a retrieval miss, said central processing unit writes the address translation information including a virtual page number regarding said retrieval miss into said first translation lookaside buffer by an exceptional process.

3. A data processor according to claim 1, further comprising a data cache memory in which a cache entry of data is stored in correspondence to the physical page number and to which the physical page number that was associatively retrieved by said first translation lookaside buffer is supplied and which associatively retrieves a cache entry corresponding to said physical page number.

4. A data processor according to claim 3, wherein a part of said data cache memory is mapped into a predetermined area which is specified by the virtual address, and said data processor further comprises a first RAM area discrimination control circuit for detecting an access to said predetermined area and for allowing said data cache memory to perform a random accessing operation.

5. A data processor according to claim 4, further comprising:

a first index mode designating circuit, wherein said first index mode designating circuit switches a specified bit of said virtual address and an upper bit than said specified bit and supplies the switched bit to said data cache memory.

6. A data processor according to claim 3, wherein the translation information which is stored in said first translation lookaside buffer has protection information to specify an access right to a page and said data processor further comprises an access protecting circuit for discrimination the access right to said page on the basis of the protection information of the translation information regarding an associated-hit.

7. A data processor according to claim 6, further comprising a detecting circuit to which the physical page number outputted by said associated-hit due to the association retrieval by said first translation lookaside buffer is inputted and which discriminates whether said inputted physical page number coincides with a physical page allocated to an I/O register space in said data processor, suppresses the associative retrieving operation of said data cache memory by a coincidence detection, and allows an I/O register to be directly accessed.

8. A data processor according to claim 3, wherein the translation information which is stored in said first translation lookaside buffer has cache write mode specified information to specify which one of a write-through and a write-back is used as a write control mode for said data cache memory and said processor further comprises a cache write control circuit for controlling the mode of a cache write to said page on the basis of said cache write mode information included in the translation information regarding an associated-hit.

9. A data processor according to claim 1, further comprising an instruction cache memory in which a cache entry of an instruction is stored in correspondence to the physical page number and to which the physical page number that was associatively retrieved by said second translation lookaside buffer is supplied and which associatively retrieves a cache entry corresponding to said physical page number.

10. A data processor according to claim 9, wherein a part of said instruction cache memory is mapped into a predetermined area that is specified by the virtual address and said data processor further comprises a second RAM area discrimination control circuit for detecting an access to said predetermined area and for allowing said instruction cache memory to perform a ransom accessing operation.

11. A data processor according to claim 10, further comprising:

a second index mode designating circuit, wherein said second index mode designating circuit switches a specified bit of said virtual address and an upper bit than said specified bit and supplies the switched bit to said instruction cache memory.

12. A data processing system, comprising:

a data processor; and an external memory connected to said data processor, wherein said data processor comprises:

central processing unit a first translation lookaside buffer in which a part of address translation information for translating a virtual address treated by said central processing unit to a physical address has been stored and which associatively retrieves a physical page number corresponding to said virtual page number that is outputted by said central processing unit from said address translation information; and a second translation lookaside buffer in which address translation information regarding an instruction address out of the address translation information possessed by said first translation lookaside buffer is stored and which associatively retrieves, from the address translation information, a physical page number corresponding to the virtual page number that is outputted by said central processing unit upon instruction fetching, said second translation lookaside buffer being coupled to said first translation lookaside buffer so that when associative retrieval with respect to a virtual page number in said second buffer results in a retrieval miss, a virtual page number concerned with said retrieval miss is applied to said first translation lookaside buffer for an associative retrieval therein and address translation information for said associative retrieval in said first translation lookaside buffer with respect to said virtual page number concerned with said retrieval miss is supplied to said second translation lookaside buffer stored into said first or second translation lookaside buffer by a control of an OS of said data processor.

13. A data processing system according to claim 12, wherein said external memory stores the address translation information to translate said virtual address to said physical address, and a part of the information used recently in said address translation information is stored into said first or second translation lookaside buffer by a control of an OS of said data processor.

14. A data processing system according to claim 12, wherein when a retrieval result of said data cache memory indicates a read miss, information as much as one cache line including data regarding the miss is read out from said external memory and is stored into said data cache memory.

15. A data processing system according to claim 12, wherein when a retrieval result of said instruction cache memory indicates a read miss, information as much as one cache line including an instruction regarding the miss is read out from said external memory and is stored into said instruction cache memory.

16. A data processor, comprising:

a central processing unit;

a first translation lookaside buffer in which a part of address translation information to translate a virtual address that is treated by said central processing unit into a physical address is stored and which associatively retrieves, from the address translation information, a physical page number corresponding to a virtual page number that is outputted by said central processing unit;

a second translation lookaside buffer in which address translation information regarding an instruction address in address translation information possessed by said first translation lookaside buffer is stored and which associatively retrieves, from the address translation information, a physical page number corresponding to the virtual page number that is outputted by said central processing unit upon instruction fetching;

a buffer control circuit for, when a result of the associative retrieval by said second translation lookaside buffer indicates a retrieval miss, associatively retrieving said first translation lookaside buffer by a virtual page number according to said retrieval miss, and for supplying the address translation information retrieved by said association retrieval to said second translation lookaside buffer;

a data cache memory in which a cache entry of data is stored in correspondence to the physical page number and to which the physical page number that was associatively retrieved by said first translation lookaside buffer is supplied and which associatively retrieves a cache entry corresponding to said physical page number, wherein the translation information which is stored in said first translation lookaside buffer has protection information to specify an access right to a page and said data processor further comprises an access protecting circuit for discrimination the access right to said page on the basis of the protection information of the translation information regarding an associated-hit; and a detecting circuit to which the physical page number that is outputted by said associated-hit due to the association retrieval by said first translation lookaside buffer is inputted and which discriminates whether said inputted physical page number coincides with a physical page allocated to an I/O register space in said data processor, suppresses the associative retrieving operation of said data cache memory by a coincidence detection, and allows an I/O register to be directly accessed.

17. A data processor, comprising:

a central processing unit;

a first translation lookaside buffer in which a part of address translation information to translate a virtual address that is treated by said central processing unit into a physical address is stored and which associatively retrieves, from the address translation information, a physical page number corresponding to a virtual page number that is outputted by said central processing unit;

a second translation lookaside buffer in which address translation information regarding an instruction address in address translation information possessed by said first translation lookaside buffer is stored and which associatively retrieves, from the address translation information, a physical page number corresponding to the virtual page number that is outputted by said central processing unit upon instruction fetching;

a buffer control circuit for, when a result of the associative retrieval by said second translation lookaside buffer indicates a retrieval miss, associatively retrieving said first translation lookaside buffer by a virtual page number according to said retrieval miss, and for supplying the address translation information retrieved by said association retrieval to said second translation lookaside buffer;

a data cache memory in which a cache entry of data is stored in correspondence to the physical page number and to which the physical page number that was associatively retrieved by said first translation lookaside buffer is supplied and which associatively retrieves a cache entry corresponding to said physical page number, wherein a part of said data cache memory is mapped into a predetermined area which is specified by the virtual address;

a first RAM area discrimination control circuit for detecting an access to said predetermined area and for allowing said data cache memory to perform a random accessing operation; and a first index mode designating circuit, wherein said first index mode designating circuit switches a specified bit of said virtual address and an upper bit than said specified bit and supplies the switched bit to said data cache memory.

18. A data processor, comprising:

a central processing unit;

a first translation lookaside buffer in which a part of address translation information to translate a virtual address that is treated by said central processing unit into a physical address is stored and which associatively retrieves, from the address translation information, a physical page number corresponding to a virtual page number that is outputted by said central processing unit;

a second translation lookaside buffer in which address translation information regarding an instruction address in address translation information possessed by said first translation lookaside buffer is stored and which associatively retrieves, from the address translation information, a physical page number corresponding to the virtual page number that is outputted by said central processing unit upon instruction fetching;

a buffer control circuit for, when a result of the associative retrieval by said second translation lookaside buffer indicates a retrieval miss, associatively retrieving said first translation lookaside buffer by a virtual page number according to said retrieval miss, and for supplying the address translation information retrieved by said association retrieval to said second translation lookaside buffer;

an instruction cache memory in which a cache entry of an instruction is stored in correspondence to the physical page number and to which the physical page number that was associatively retrieved by said second translation lookaside buffer is supplied and which associatively retrieves a cache entry corresponding to said physical page number,
wherein a part of said instruction cache memory is mapped into a predetermined area that is specified by the virtual address;

a second RAM area discrimination control circuit for detecting an access to said predetermined area and for allowing said instruction cache memory to perform a ransom accessing operation; and a second index mode designating circuit,
wherein said second index mode designating circuit switches a specified bit of said virtual address and an upper bit than said specified bit and supplies the switched bit to said instruction cache memory.

* * * * *